United States Patent
Gotoh et al.

(10) Patent No.: US 7,073,933 B2
(45) Date of Patent: Jul. 11, 2006

(54) LIGHT GUIDE PLATE, LIGHT SOURCE DEVICE EQUIPPED THEREWITH AND DISPLAY DEVICE

(75) Inventors: Takeshi Gotoh, Kawasaki (JP); Tetsuya Hamada, Kawasaki (JP); Toshihiro Suzuki, Kawasaki (JP); Tetsuya Kobayashi, Kawasaki (JP); Keiji Hayashi, Kawasaki (JP); Mari Sugawara, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 246 days.

(21) Appl. No.: 10/264,864

(22) Filed: Oct. 4, 2002

(65) Prior Publication Data
US 2003/0137821 A1 Jul. 24, 2003

(30) Foreign Application Priority Data
Jan. 23, 2002 (JP) ............................. 2002-013766

(51) Int. Cl.
*F21V 7/04* (2006.01)
(52) U.S. Cl. ...................... 362/624; 362/560; 362/623; 362/628; 362/26; 362/330; 362/297
(58) Field of Classification Search ................ 362/560, 362/31, 26, 330, 19, 365, 148, 297, 300, 362/301, 346, 623, 624, 628; 349/96, 98, 349/65, 63
See application file for complete search history.

(56) References Cited

U.S. PATENT DOCUMENTS

| 5,886,759 | A | * | 3/1999 | Mashino et al. | ............... 349/65 |
| 6,631,998 | B1 | * | 10/2003 | Egawa et al. | .................. 362/31 |
| 6,742,921 | B1 | * | 6/2004 | Umemoto et al. | .......... 362/561 |
| 2003/0165067 | A1 | * | 9/2003 | Imamura et al. | ............ 362/560 |

FOREIGN PATENT DOCUMENTS

| JP | 2001-255415 | | 9/2001 |
| JP | 2001-281456 | | 10/2001 |
| JP | 2004127810 A | * | 4/2004 |

* cited by examiner

*Primary Examiner*—Sandra O'Shea
*Assistant Examiner*—Anabel Ton
(74) *Attorney, Agent, or Firm*—Greer, Burns & Crain, Ltd.

(57) ABSTRACT

A display device used for a display unit of portable electronic equipment, a light source device therefor and a light guide plate, suppressing dispersion in the brightness and featuring a high contrast and a good display quality. The constitution includes a light incidence surface on where light emitted from an LED falls, a light reflection surface formed facing the light incidence surface and reflects light from the light incidence surface, a light outgoing surface arranged between the light incidence surface and the light reflection surface, and has a circularly polarizing plate intimately adhered onto the surface thereof, and an opposing surface formed facing the light outgoing surface and in which there are alternately arranged first opposing surfaces for guiding the incident light to the light outgoing surface as well as to the light reflection surface, and second opposing surfaces for emitting the light reflected by the light reflection surface through the light outgoing surface.

31 Claims, 18 Drawing Sheets

LIGHT GUIDE PLATE, LIGHT SOURCE DEVICE EQUIPPED THEREWITH AND DISPLAY DEVICE

BACKGROUND OF THE INVENTION

1. Field of the Invention

This invention relates to a display device used for a display unit such as of a portable electronic equipment, a light source device used therefor, and a light guide plate.

2. Description of the Related Art

Accompanying the widespread use of portable data terminals, it has been urged to provide a display device which consumes small amount of electric power. The reflection type liquid crystal display device realizes a low power consumption accompanied, however, by such a problem that a good display quality is not obtained unless the display device is used in a sufficiently bright environment such as outdoors. Therefore, the reflection type liquid crystal display device is generally used in combination with a front-light unit which is arranged on the side of the display screen and is illuminated with a plane source of light.

As a source of light for the front-light unit, there is used a cold cathode tube or a light-emitting diode (LED). An LED which is light in weight and is small size has been frequently used for relatively small liquid crystal display devices. Unlike the cold cathode tube which is a linear source of light, the LED is a point source of light. To uniformly illuminate the display screen, therefore, a structure is necessary for uniformly spreading light.

FIG. 22 is a view illustrating the constitution of a conventional front-light reflection type liquid crystal display device. FIG. 22A is a view illustrating the constitution of the reflection-type liquid crystal display device as viewed from the side of the display screen, and FIG. 22B is a sectional view of the reflection-type liquid crystal display device cut along the line A—A in FIG. 22A. Referring to FIGS. 22A and 22B, the reflection-type liquid crystal display device is constituted by a front-light unit FL and a reflection-type liquid crystal display panel 102. A polarizing plate 140 is stuck to the surface of the reflection-type liquid crystal display panel 102 on the side of the display screen. Further, a transparent planar light guide plate 104 that constitutes a portion of the front-light unit FL is arranged on the side of the display screen of the polarizing plate 140 maintaining a predetermined gap. A nearly flat light outgoing surface 128 is formed on the planar light guide plate 104 on the side of the liquid crystal display panel 102. A light incidence surface 122 on which light emitted from the source of light will fall, is formed on the left side of the planar light guide plate 104 in FIGS. 22A and 22B. On the planar light guide plate 104 on the side of the display screen, there are alternately formed a plurality of mildly inclined surfaces 112 that are inclined at a relatively small angle toward the light incidence surface 122 with respect to the light outgoing surface 128 and a plurality of steeply inclined surfaces 110 that are inclined at a relatively large angle toward the surface 144 facing the light incidence surface 122 with respect to the light outgoing surface 128.

On the left of the planar light guide plate 104 in FIGS. 22A and 22B, a linear light guide plate 106 is arranged along the light incidence surface 122 of the planar light guide plate 104. LEDs 108 are disposed at both ends of the linear light guide plate 106. The linear light guide plate 106 is used for trimming the outgoing direction of light from the LEDs 108 which are point sources of light to establish a linear source of light. The linear light guide plate 106 has a plurality of notch-like recessed portions 142 formed in the surface facing the light incidence surface 122. Upon adjusting the density of formation of recessed portions 142, light that is uniformly distributed is emitted into the planar light guide plate 104 from the linear light guide plate 106.

Light emitted from the linear light guide plate 106 travels through the planar light guide plate 104 while being totally reflected by the mildly inclined surfaces 112 and by the light outgoing surface 128, whereby light incident on the steeply inclined surfaces 110 is emitted toward the reflection-type liquid crystal display panel 102. Light reflected by a reflection electrode formed on the pixel of the reflection-type liquid crystal display panel 102, passes through the planar light guide plate 104 and is emitted to the side of the display screen.

However, the conventional front-light reflection type liquid crystal display device using LEDs 108 as sources of light, involves the following two problems.

(1) Low Efficiency and Low Brightness.

Light emitted from the LEDs 108 falls on the planar light guide plate 104 through the linear light guide plate 106. Here, the utilization efficiency of light is a product of a utilization efficiency of light falling on the linear light guide plate 106 from the LEDs 108, a utilization efficiency of light in the linear light guide plate 106, and a utilization efficiency of light falling on the planar light guide plate 104 from the linear light guide plate 106. Therefore, the utilization efficiency of light inevitably decreases. In particular, when the point source of light is turned into a linear source of light by using a linear light guide plate 106, there exists a trade-off relationship between the light utilization efficiency and the uniformity in the distribution of light quantity, making it difficult to improve the light utilization efficiency. To accomplish a highly bright illumination, therefore, it is necessary to increase the number of the LEDs 108 since there is a limitation on the amount of light per each LED 108. FIG. 23 is a view illustrating the constitution of the front-light reflection type liquid crystal display device in which the number of the LEDs 108 is increased to four, as viewed from the side of the display screen. Referring to FIG. 23, when the number of the LEDs 108 is increased to four, the size of the linear light guide plate 106' must be increased, offsetting the merit of decreasing the size by the use of LEDs 108.

(2) High Cost of Production.

The number of parts increases as compared to the conventional constitution of using the cold cathode tube. Besides, it is necessary to precisely arrange the linear light guide plate 106, planar light guide plate 104 and LEDs 108, resulting in an increase in the cost of production.

In order to solve the above two problems, there has been proposed a light guide plate of a structure in which light travels reciprocally, by providing a reflector on a surface (hereinafter referred to as light reflection surface) facing the light incidence surface 122 to reflect the incident light, and the reflected light is further reflected by the steep surfaces so as to be emitted to the side of the liquid crystal display panel 102. FIG. 24 is a view illustrating a front-light reflection type liquid crystal display device of the structure in which light travels reciprocally. FIG. 24A is a view of the structure of the reflection type liquid crystal display device of when it is viewed from the side of the display screen, and FIG. 24B is a sectional view of the reflection type liquid crystal display device cut along the line B—B in FIG. 24A. As shown in FIGS. 24A and 24B, an LED 108 is arranged at the center of the light incidence surface 122 of the light guide plate 120. A reflector 124 is provided on the surface of the light reflection surface 126 opposing the light incidence surface 122. A nearly flat light outgoing surface 128 is formed on the light guide plate 120 on the side of the liquid crystal display panel 102. Mildly inclined surfaces 113 and steeply inclined surfaces 111 are formed on the light guide plate 120 on the side facing the light outgoing surface 128. The surfaces 113 are mildly inclined toward the light reflection surface 126 at an angle of about 2° with respect to the light outgoing surface 128, and the surfaces 111 are steeply inclined toward the light incidence surface 122 at an angle of about 45° with respect to the light outgoing surface 128.

Light emitted from the LED 108 and is falling on the light guide plate 120, propagates through the light guide plate 120 while being totally reflected repetitively by the light outgoing surface 128 and by the mildly inclined surfaces 113, and is reflected by the reflector 124. The LED 108 is a point source of light. Therefore, light emitted therefrom travels toward the reflector 124 while spreading. Therefore, the distribution of light becomes nearly uniform on the reflector 124. Light is reflected by the reflector 124, falls again on the light guide plate 120, and is reflected by the steeply inclined surfaces 111 and is emitted toward the reflection type liquid crystal display panel 102.

Even by using the light guide plate 120 of the above structure in which light travels reciprocally, however, there remain problems as described below. Namely, light incident on the light guide plate 120 from the LED 108 mostly travels while being totally reflected by the mildly inclined surfaces 113 and the light outgoing surface 128. As described above, however, there exists an inclined angle of about 2° between the mildly inclined surfaces 113 and the light outgoing surface 128. Therefore, the angles of incidence of light incident on the surfaces 113 and 128 gradually decrease and finally become smaller than the critical angle. As shown in FIG. 24B, the ray 202 of light directly goes out of the light guide plate 120 through the mildly inclined surfaces 113 and the light outgoing surface 128 bringing about such a problem that the light utilization efficiency further decreases. In particular, the ray 202 of light that is directly emitted toward the display screen from the mildly inclined surfaces 113, is further reflected by the steeply inclined surfaces 111 and is emitted in a direction nearly perpendicular to the display screen, arousing a problem of a decrease in the contrast.

Though the distribution of light quantities becomes even on the reflector 124, the light distribution characteristics are not even since the angle of incidence of light to the reflector 124 differs depending upon the distance from the center of the reflector 124. Therefore, light is unevenly distributed as it is reflected by the reflector 124 and is guided again through the light guide plate 120 entering from the light reflection surface 126. Accordingly, light emitted into the reflection type liquid crystal display panel 102 from the light outgoing surface 128, is unevenly distributed, whereby brightness becomes irregular and the quality of display drops. This problem can be relaxed by rendering the surface of the reflector 124 to be scatter-reflection surface and by reflecting the ray 204 of light in a scattering manner, which, however, is not a complete solution. Besides, the light utilization efficiency inevitably drops due to the scattering of light or due to loss caused by scattering, and a complete solution is not obtained.

Moreover, the conventional front-light liquid crystal display device has a problem in that the contrast ratio of when the front-light is turned on is very smaller than the contrast ratio of when the back-light of the back-light liquid crystal display device is turned on. This is because, the light guide plate 120 has been disposed on the display screen side of the liquid crystal display panel 102, and a part of light irradiated from the front-light unit is reflected by the light outgoing surface 128 and the like of the light guide plate 120 instead of being reflected by the reflection electrode of the liquid crystal display panel 102.

To prevent the reflection by the light outgoing surface 128 and the like, in general, a reflection-preventing film is formed on the light outgoing surface 128 of the light guide plate 120 and on the surface of the liquid crystal display panel 102 on the side of the light guide plate 120. However, the polarizing plate 140 stuck to the surface of the liquid crystal display panel 102 and the light guide plate 120 are both formed of a resin, and it is not allowed to elevate the temperature of the substrate at the time of forming the film. Accordingly, a thin film of a high quality is not formed, the reflection is not prevented to a sufficient degree by the reflection-preventing film, and there remains a reflection factor of from 0.1 to 0.2%. Since the contrast ratio that is obtained is only about 10, it has been desired to further enhance the contrast ratio.

SUMMARY OF THE INVENTION

It is therefore an object of the present invention to provide a display device which suppresses dispersion in the brightness, features a high contrast and a good display quality, a power source device used therefor, and a light guide plate.

The above object is accomplished by a light guide plate comprising a light incidence portion having a light incidence surface on where light emitted from a point source of light falls; a light reflection surface formed facing the light incidence surface to reflect light from the light incidence surface; a light outgoing surface arranged between the light incidence surface and the light reflection surface, and having a circularly polarizing plate intimately adhered onto the surface thereof; an opposing surface formed facing the light outgoing surface and in which there are alternately arranged first opposing surfaces for guiding the incident light to the light outgoing surface as well as to the light reflection surface, and second opposing surfaces for emitting the light reflected by the light reflection surface through the light outgoing surface; and side end surfaces arranged between the light incidence surface and the light reflection surface, and are formed at both ends of the light outgoing surface and of the opposing surface.

DETAILED DESCRIPTION OF THE PREFERRED EMBODIMENTS

First Embodiment

A light guide plate, a light source device equipped therewith and a display device according to a first embodiment of the invention will now be concretely described by way of Examples 1-1 to 1-6.

EXAMPLE 1-1

Figure 1A:
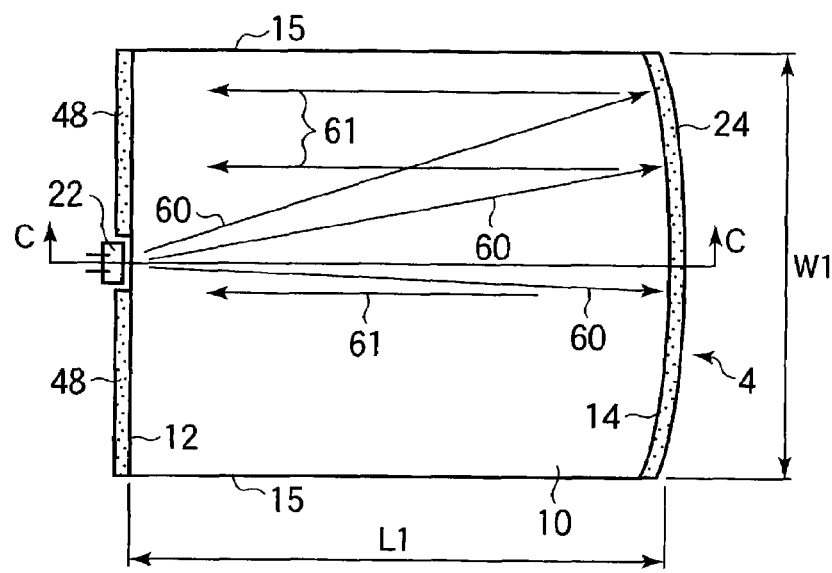
FIGS. 1A to 1C are views illustrating the constitutions of a light guide plate, a light source device equipped therewith and a display device according to Example 1-1 of a first embodiment of the invention.
Figure 1B:
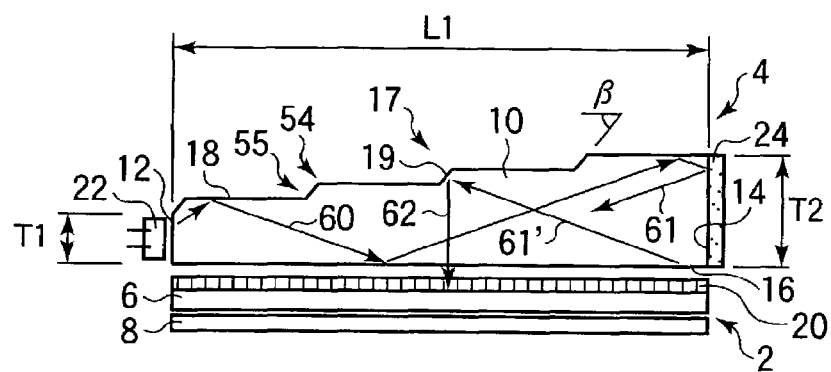
Figure 1C:
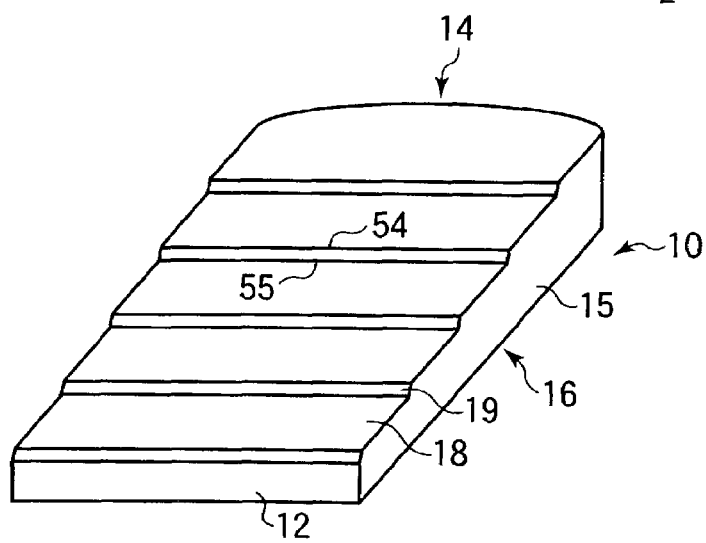

First, the light guide plate, light source device equipped therewith and display device according to Example 1-1 of the embodiment will be described with reference to FIGS. 1A to 1C. FIGS. 1A to 1C illustrate the constitutions of the light guide plate, light source device equipped therewith and display device according to the Example. FIG. 1A is a view illustrating the constitution of when the display device is viewed from the side of the display screen, FIG. 1B is a sectional view of the display device cut along the line C—C in FIG. 1A, and FIG. 1C is a perspective view illustrating the constitution of the light guide plate according to the Example. Referring to FIGS. 1A to 1C, the display device according to the Example includes a reflection type liquid crystal display panel 2 constituted by two pieces of substrates 6, 8 and liquid crystals (not shown) sealed between the two substrates 6, 8, and a light source device (front-light unit) 4 arranged near the substrate 6 on the side of the display screen of the liquid crystal panel 2. The liquid crystal display panel 2 has a plurality of pixels arranged like a matrix. Each pixel has a reflection electrode which is not shown. A circularly polarizing plate 20 is stuck to the surface of the substrate 6 on the side of the light source device 4. The circularly polarizing plate 20 is constituted by a λ/4 phase-difference plate arranged on the side of the substrate 6 and a linearly polarizing plate arranged on the side of the light source device 4.

The light source device 4 has an LED 22 which is a point source of light and a light guide plate 10. The light guide plate 10 has the shape of a thin plate of nearly a rectangular shape. A nearly flat light outgoing surface 16 is formed on the light guide plate 10 on the side of the liquid crystal display panel 2 to emit light to the liquid crystal display panel 2. An opposing surface 17 is formed on the light guide plate 10 on the side of the display screen so as to be opposed to the light outgoing surface 16. The opposing surface 17 is constituted by a plurality of first opposing surfaces 18 and a plurality of second opposing surfaces 19 that are alternately arranged. A light incidence surface 12 (light incidence portion) is formed on the light guide plate 10 on the side of LED 22, and a light reflection surface 14 is formed on the side that opposes the light incidence surface 12. The first opposing surfaces 18 on the opposing surface 17 are formed nearly in parallel with the light outgoing surface 16. The second opposing surfaces 19 are so inclined as to become lower toward the side of the light incidence surface 12, so that light reflected by the light reflection surface 14 is reflected toward the light outgoing surface 16. The angle β of inclination of the second opposing surfaces 19 with respect to the light outgoing surface 16 is $30° \leq \beta \leq 40°$, and is 40° in this Example. Corners 54, 55 formed by the first opposing surfaces 18 and by second opposing surfaces 19 extend nearly in parallel with the light incidence surface 12 (see FIG. 1C).

Referring to FIG. 1A, the light reflection surface 14 is formed in a parabolic shape with a position where the LED 22 is arranged (center of light emission) as a focal point as viewed in a direction perpendicular to the display screen. As shown in FIG. 1B, further, the cross section of the light reflection surface 14 which is perpendicular to the display screen, is nearly perpendicular to the light outgoing surface 16. A reflector 24 is provided on the light reflection surface 14. A highly reflecting material such as aluminum may be evaporated on the light reflection surface 14 to form a reflection film instead of providing the reflector 24. In the drawing, the LED 22 is arranged in a number of one at the central portion of the light incidence surface 12. However, a plurality of LEDs 22 may be provided in a concentrated manner within a region in which they can be regarded as a point relying upon a predetermined reference.

The light guide plate 10 is formed by the injection-molding, and is made of a transparent material such as PMMA (polymethyl methacrylate).

The light outgoing surface 16 is coated with a hard silicon resin and on which a reflection-preventing film is formed by the vacuum evaporation. Further, a similar reflection-preventing film is formed on the surface of the circularly polarizing plate 20 formed on the substrate 6 on the side of the light guide plate 10.

The light guide plate 10 is designed for use in the reflection-type liquid crystal display device having a diagonal distance of, for example, 3.5 inches, and has a length L1 of, for example, 76 mm and a width W1 of, for example, 59 mm. Referring to FIG. 1C, the light guide plate 10 is formed in a stepped shape having the first opposing surfaces 18 in parallel with the light outgoing surface 16 and second opposing surfaces 19 inclined so as to become lower toward the light incidence surface 12. Therefore, the thickness differs depending on the side of the light incidence surface 12 and the side of the light reflection surface 14. The thickness T1 on the side of the light incidence surface 12 is, for example, 1.0 mm and the thickness T2 on the side of the light reflection surface 14 is, for example, 1.9 mm.

In this embodiment as shown in FIG. 1A, the LED 22 is arranged on the side of the short side of the light guide plate 10 as viewed in a direction perpendicular to the display screen, and the distance L1 from the LED 22 to the light reflection surface 14 is relatively greater than the width W1. This makes it possible to suppress the light reflection surface 14 formed in a parabolic shape with the position where the LED 22 is arranged as a focal point, from swelling outward. Accordingly, the light guide plate 10 can be formed in a small size and having a reduced weight. Light reflected by the side end surfaces 15 is reflected by the light reflection surface 14 and is further reflected by a prism; i.e., light having a large angle of incidence goes out from the light outgoing surface 16 and falls on the liquid crystal display panel 2, generally, serving as "undesired light" that lowers the contrast of display. Therefore, a black light-absorbing material is applied onto the side end surfaces 15 to enhance the contrast of display. The light reflection surface 14 may be formed flat by dividing the parabolic surface into tiny prism elements like the Fresnel lens. This makes it possible to form the light reflection surface 14 flat, and the light guide plate 10 is realized in a further decreased size having a further reduced weight.

When arranged in a plural number, the LEDs 22 are arranged on the side of the short side of the light guide plate 10. Therefore, rays of light emitted from the LEDs 22 are mixed together to a sufficient degree before arriving at the light reflection surface 14, and dispersion in the brightness is lowered.

Next, described below is the operation of the light guide plate and of the light source device equipped with the light guide plate according to the Example. Referring to FIG. 1B, the ray 60 of light emitted from the LED 22 enters the light guide plate 10 through the light incidence surface 12. Assuming that the air has a refractive index N1 of 1.0, if the PMMA has a refractive index N2 of 1.489, then, a critical angle $\theta 1$ ($=\sin^{-1}$ (N1/N2)) between the first opposing surface 18 and the light outgoing surface 16 becomes 42.19°. That is, if the angle of incidence of the ray 60 of light to the first opposing surface 18 is not smaller than 42.19°, then, the ray 60 of light is totally reflected by the first opposing surface 18. The first opposing surface 18 is nearly in parallel with the light outgoing surface 16. Therefore, the ray 60 of light totally reflected by the first opposing surface 18 falls on the light outgoing surface 16 nearly at the same angle of incidence and is totally reflected. Thus, the ray 60 of light totally reflected by the first opposing surface 18 or by the light outgoing surface 16 all travels toward the light reflection surface 14 while being totally and repetitively reflected by the light outgoing surface 16 and by the first opposing surfaces 18, and is reflected by the light reflection surface 14 as a ray 61 of light.

As shown in FIG. 1A, further, when viewed from the side of the display screen, a plurality of rays 60 of light emitted from the LED 22 travel through the light guide plate 10 while diverging therein and fall on nearly the whole light reflection surface 14. As described above, the light reflection surface 14 has a parabolic shape with the position where the LED 22 is arranged as a focal point as viewed from a direction perpendicular to the display screen. Therefore, a plurality of rays 60 of light are reflected by the light reflection surface 14 as a plurality of parallel rays 61 of light. Due to the plurality of rays 61 of light, nearly uniform light distribution characteristics are realized in the light guide plate 10.

Referring to FIG. 1B, the ray 61' of light reflected by the light reflection surface 14 is reflected by the second opposing surfaces 19 as a ray 62 of light. The ray 62 of light is emitted from the light outgoing surface 16 toward the liquid crystal display panel 2 and falls on the liquid crystal display panel 2 maintaining nearly even light distribution characteristics like the rays 61 of light.

Figure 24A:
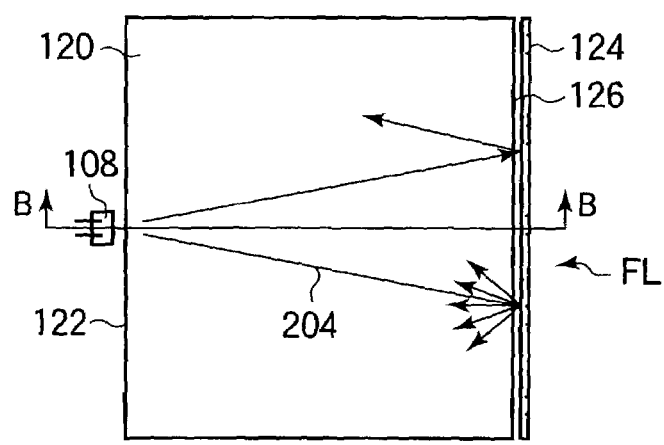
FIGS. 24A and 24B are diagrams illustrating still further constitutions of a conventional light guide plate, a light source device equipped therewith and a display device.
Figure 24B:
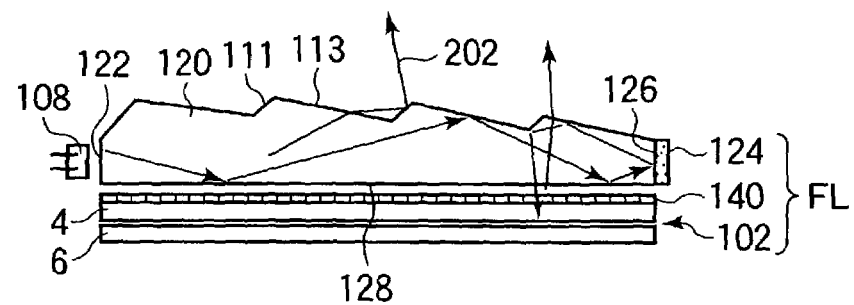

The first opposing surfaces 18 are formed nearly in parallel with the light outgoing surface 16. Unlike the conventional light guide plate 120 shown in FIG. 24B, therefore, the ray 60 of light heading to the light reflection surface 14 maintains angles of incidence to the first opposing surfaces 18 and to the light outgoing surface 16, which are greater than the critical angle. Therefore, light before arriving at the light reflection surface 14 is not directly emitted to the side of the display screen from the first opposing surfaces 18, and a drop in the contrast is suppressed.

In this Example, further, the ray 62 of light having nearly even light distribution characteristics is incident upon the liquid crystal display panel 2, and there is obtained a display of a high quality with little dispersion in the brightness.

The peak intensity in the ray 62 of light is in a direction inclined by about 20° toward the light incidence surface 12 with respect to the direction perpendicular to the display screen. Therefore, the peak intensity of light reflected by the liquid crystal display panel 2, too, is in a direction inclined by about 20° toward the light incidence surface 12 with respect to the direction perpendicular to the display screen.

On the regions of the light incidence surface 12 except the region where the LED 22 is arranged, there may be formed by vaporization a reflection film 48 of aluminum as a light reflection portion. Then, though some light reflected by the light reflection surface 14 may return to the light incidence surface 12 without being emitted from the light outgoing surface 16 to the liquid crystal display panel 2, this light that has returned is not spoiled but is reused enabling the light utilization efficiency to be improved. Therefore, the display of a high brightness is achieved.

EXAMPLE 1-2

Figure 2A:
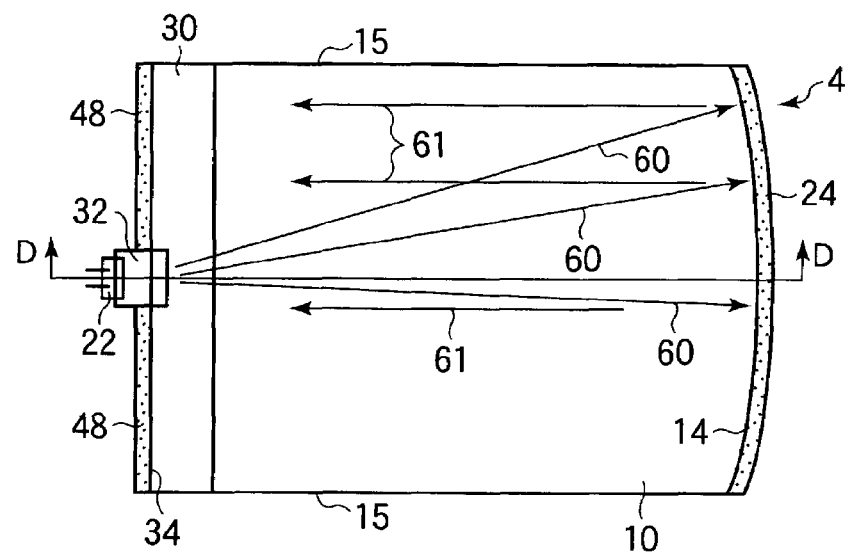
FIGS. 2A to 2C are views illustrating the constitutions of the light guide plate, the light source device equipped therewith and the display device according to Example 1-2 of the first embodiment of the invention.
Figure 2B:
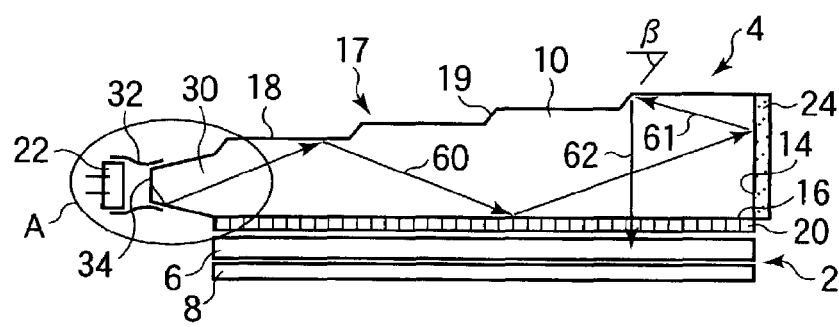
Figure 2C:
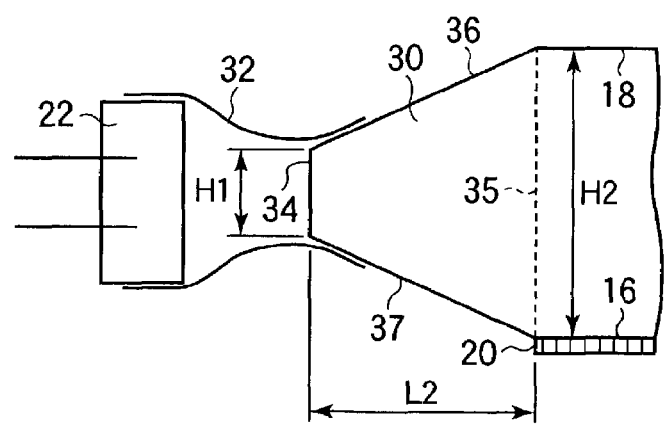

Next, the light guide plate, light source device equipped therewith and display device according to Example 1-2 of the embodiment will be described with reference to FIGS. 2A to 3. FIGS. 2A to 2C illustrate the constitutions of the light guide plate, light source device equipped therewith and display device according to the Example. FIG. 2A is a view illustrating the constitution of when the display device is viewed from the side of the display screen, FIG. 2B is a sectional view of the display device cut along the line D—D in FIG. 2A, and FIG. 2C is a view illustrating a region A of FIG. 2B on an enlarged scale. Constituent elements having the same functions and actions as those of the constituent elements of the light guide plate, light source device equipped therewith and display device of Example 1-1, are denoted by the same reference numerals but their description is not repeated. In the constitution of this Example, the first opposing surfaces 18 are in parallel with the light outgoing surface 16, the angle β of inclination of the second opposing surfaces 19 with respect to the light outgoing surface 16 is $30° \leq \beta \leq 40°$, and is 37° in this Example. As shown in FIGS. 2A and 2B, a circularly polarizing plate 20 is stuck to the light outgoing surface 16 of the light guide plate 10 via an adhesive agent (not shown). The adhesive agent has a refractive index N3 of, for example, 1.467. The refractive index N3 of the adhesive agent and the refractive index of the circularly polarizing plate 20 are close to the refractive index N2 (1.489) of PMMA which is the material of the light guide plate 10, making it possible to very decrease the reflection of light by the light outgoing surface 16. Light reflected by the surface of the circularly polarizing plate 20 on the side of the liquid crystal display panel 2 and light from the side of the light guide plate 10 reflected by the surface of the substrate 6 of the liquid crystal display panel 2, are absorbed by the circularly polarizing plate 20 and do not fall again on the light guide plate 10. Therefore, no reflection-preventing film needs be formed on the light outgoing surface 16 and, besides, a higher reflection-preventing effect is obtained.

Since the circularly polarizing plate 20 is intimately stuck to the light outgoing surface 16, the critical angle at the light outgoing surface 16 changes to become $\theta 2$ $(=\sin^{-1}(N3/N2))=80.1°$. Light incident on the light outgoing surface 16 at an angle smaller than 80.1° is gradually absorbed by the circularly polarizing plate 20 as it travels through the light guide plate 10, resulting in a decrease in the light utilization efficiency. In order to suppress a drop in the light utilization efficiency, therefore, the directivity of light in the direction of thickness of the light guide plate 10 must be improved by some means. In order that the light falls on the light outgoing surface 16 at an angle of not smaller than 80.1°, in the thickness direction of the light guide plate 10, the angle of light entering the light guide plate 10 from the light incidence surface 12 subtended by the normal to the light incidence surface 12 (hereinafter referred to as outgoing light) may be suppressed to be within ±9.9°. The light incidence surface 12, light outgoing surface 16 and first opposing surfaces 18 are intersecting nearly at right angles.

The present inventors have extensively studied the method of improving the directivity of light, and have discovered the fact that the directivity of light can be most efficiently improved by a system which uses a light guide passage 30 of a tapered shape in cross section. Referring to FIGS. 2A to 2C, the light guide passage 30 (portion for improving the directivity) is formed integrally with the light guide plate 10 to improve the directivity, and includes a light incidence surface 34, an imaginary light outgoing surface 35 and tapered surfaces 36 and 37. The tapered surfaces 36 and 37 are so inclined that the width H1 of the light incidence surface 34 becomes narrower than the width H2 of the light outgoing surface 35.

The degree of improving the directivity through the light guide plate 30 varies depending upon (1) the ratio of the area of the imaginary light outgoing surface 35 to the area of the light incidence surface 34, and (2) the length L2 of the light guide passage 30 in a direction in which light travels. There, however, exists a tendency in that the directivity is improved (1) when the area ratio is large and (2) when the length L2 is large. However, since it is not allowed to increase the thickness of the light guide plate 10, limitation is imposed on the width H2 of the light outgoing surface 35. Besides, the width H1 of the light incidence surface 34 is limited by the size of the LED 22. The present inventors have repetitively conducted simulation and production of prototypes, and have discovered the fact that the directivity can be efficiently improved when the width H1 of the light incidence surface 34 is 0.5 mm, the width H2 of the light outgoing surface 35 is 1.0 mm and the length L2 of the light guide passage 30 is 1.9 mm. The width H1 of the light incidence surface 34 is narrower than the size (0.8 mm) of the LED 22. Therefore, light is incident on the light guide plate 10 through a reflector (reflection plate) 32 having an inversely tapered shape in cross section.

Figure 3:
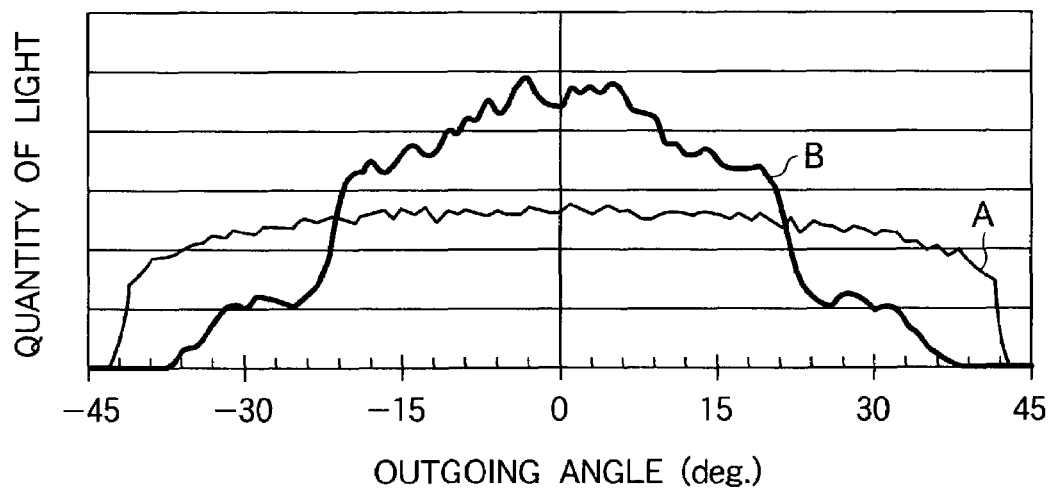
FIG. 3 is a graph illustrating the distribution of light quantities depending upon the outgoing angle of the rays of light.

FIG. 3 is a graph illustrating the distribution of quantities of light emitted from the LED 22 on the light incidence surface 34 depending upon the outgoing angle, wherein the abscissa represents the outgoing angle (deg.) of light in the direction of thickness of the light guide plate 10 from the light incidence surface 34 of when the direction in parallel with the light outgoing surface 16 is 0° and the ordinate represents the quantity of light. A thin line A in the graph represents a distribution of light quantities of a conventional light guide plate 10 without equipped with the light guide passage 30. The light emitted from the LED 22 and is falling on the light incidence surface 34, is nearly evenly distributed over a range of about ±40° from a direction in parallel with the light outgoing surface 16. A thick line B in the graph represents a distribution of light quantities of the light guide plate 10 which has an improved directivity due to the light guide passage 30. Though the light entering the light guide plate 10 from the light incidence surface 34 is not all confined to be within the outgoing angle of ±9.9°, it will be learned that the quantity of light within the outgoing angle of ±9.9° has increased to be more than 70% as compared to the prior art.

In this Example, the circularly polarizing plate 20 absorbs the light which according to the conventional structure was reflected by the light outgoing surface 16 and was directly emitted to the side of the display screen accounting for a decrease in the contrast. Therefore, the contrast is greatly improved when being illuminated with external light as well as when being illuminated by the light source device 4. Further, since the directivity of light is improved by the light guide passage 30, a drop in the light utilization efficiency is suppressed despite the circularly polarizing plate 20 is stuck to the light outgoing surface 16. Further, since the range of outgoing angles of light going out from the light incidence surface 34 is limited to lie within a range of high reflection factors of the liquid crystal display panel 2, it is allowed to realize a display device featuring high brightness and good display quality.

This Example uses the light guide passage 30 to improve the directivity of light to which only, however, the invention is in no way limited provided there is obtained the same effect. For example, there may be used a prism sheet. The same effect can also be obtained by using a highly directive LED 22 incorporating a lens.

EXAMPLE 1-3

Figure 4:
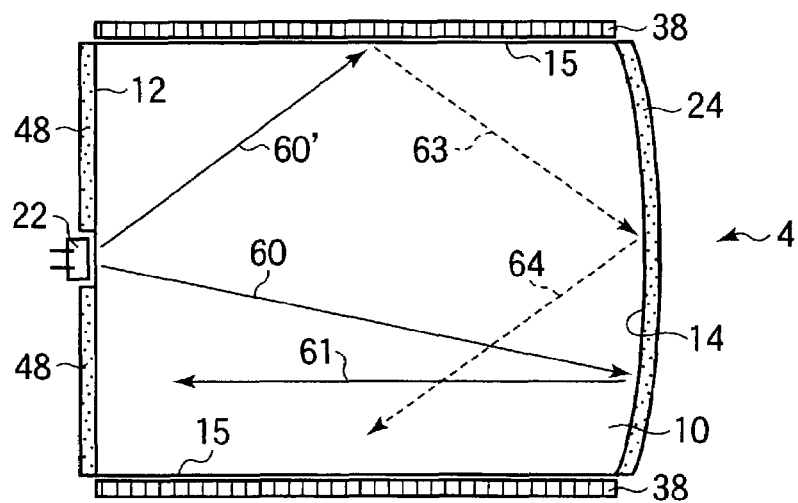
FIG. 4 is a view illustrating the constitutions of the light guide plate and the light source device equipped therewith according to Example 1-3 of the first embodiment of the invention.

Next, the light guide plate, light source device equipped therewith and display device according to Example 1-3 of the embodiment will be described with reference to FIGS. 4 to 5B. FIG. 4 illustrates the constitutions of the light guide plate and light source device equipped therewith according to the Example. Constituent elements having the same functions and actions as those of the constituent elements of the light guide plate and light source device equipped therewith of Examples 1-1 and 1-2, are denoted by the same reference numerals but their description is not repeated. As shown in FIG. 4, the light guide plate 10 according to this Example has a feature in that black tapes 38 that serve as portions for absorbing light are stuck to the surfaces of both end surfaces 15.

Rays of light incident through the light incidence surface 12 include rays 60 of light falling on the light reflection surface 14 as well as rays 60' of light falling on the end surfaces 15 on both sides. The rays 60' of light are reflected by the side end surfaces 15 as rays 63 of light, further reflected by the light reflection surface 14 as rays 64 of light, and travel in the directions different from the rays 61 of light travelling nearly in parallel with the side end surfaces 15. The rays 64 of light lower the evenness in the light distribution characteristics. Therefore, light emitted to the liquid crystal display panel 2 from the light outgoing surface 16 (not shown in FIG. 4) is irregularly distributed, and the display device exhibits dispersion in the brightness.

The light guide plate 10 of this Example has black tapes 38 on both side end surfaces 15. Therefore, the rays 60' of light are absorbed by the tapes 38, and there are not generated rays 63, 64 of light that become a cause of dispersion in the brightness of the display device. The rays 60' of light may be attenuated by any other light-absorbing method instead of the black tapes 38.

Figure 5A:
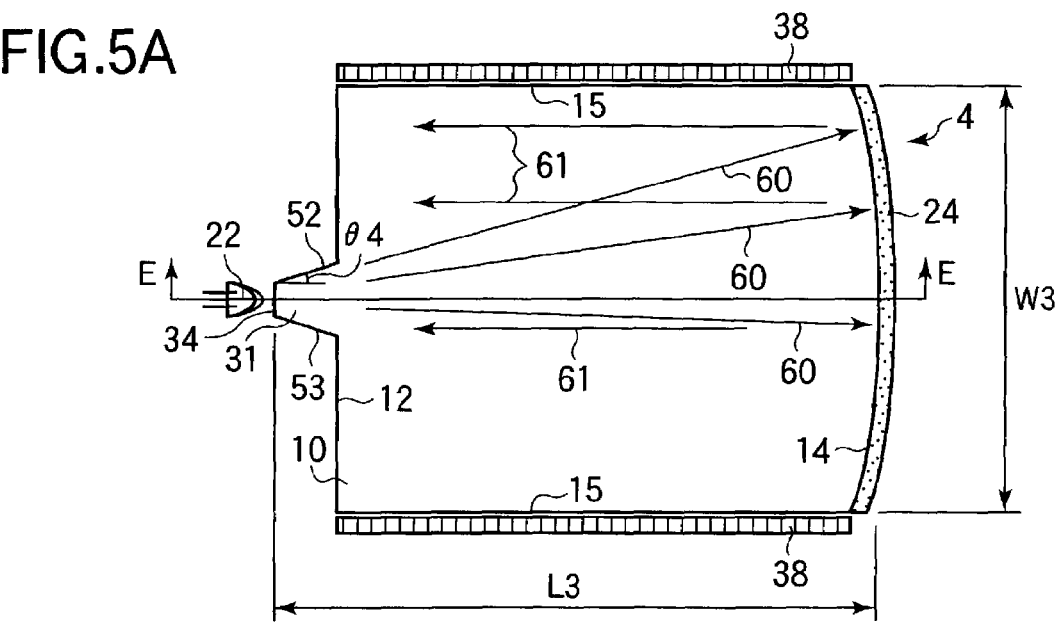
FIGS. 5A and 5B are views illustrating modified constitutions of the light guide plate and the light source device equipped therewith according to Example 1-3 of the first embodiment of the invention.
Figure 5B:
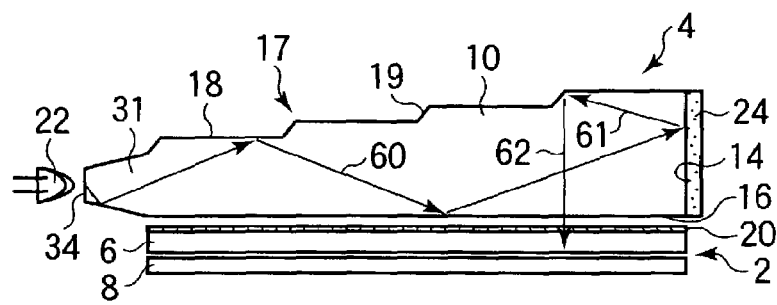

FIGS. 5A and 5B illustrate the constitutions of the light guide plate, light source device equipped therewith and display device according to modified Example. FIG. 5A is a view illustrating the constitution of the display device as viewed from the side of the display screen, and FIG. 5B is a sectional view of the display device cut along the line E—E in FIG. 5A. Constituent elements having the same functions and actions as those of the constituent elements of the light guide plate, light source device equipped therewith and display device of Examples 1-1 and 1-2, are denoted by the same reference numerals but their description is not repeated. As shown in FIG. 5A, the light guide plate 10 according to this Example has a light guide passage 31 which is tapered even as viewed in a direction perpendicular to the display screen. If the width of the light guide plate 10 is denoted by W3, and the distance from the light incidence surface 34 to the light reflection surface 14 is denoted by L3, then, the angle θ4 between the tapered surfaces 52, 53 of the light guide passage 31 and the side end surfaces 15 as viewed in a direction perpendicular to the display screen, is given as, $$\theta 4 \leq \tan^{-1}(W3/(2 \times L3))$$

Therefore, the rays 60 of light from the light incidence surface 34 do not fall on both side end surfaces 15.

According to this modified Example, the directivity of light is improved due to the light guide passage 31, and the rays 60' of light directly fall in decreased amounts on the side end surfaces 15. A prism sheet may be used instead of the light guide passage 31, or a highly directive LED 22 incorporating a lens may be used.

EXAMPLE 1-4

Figure 6:
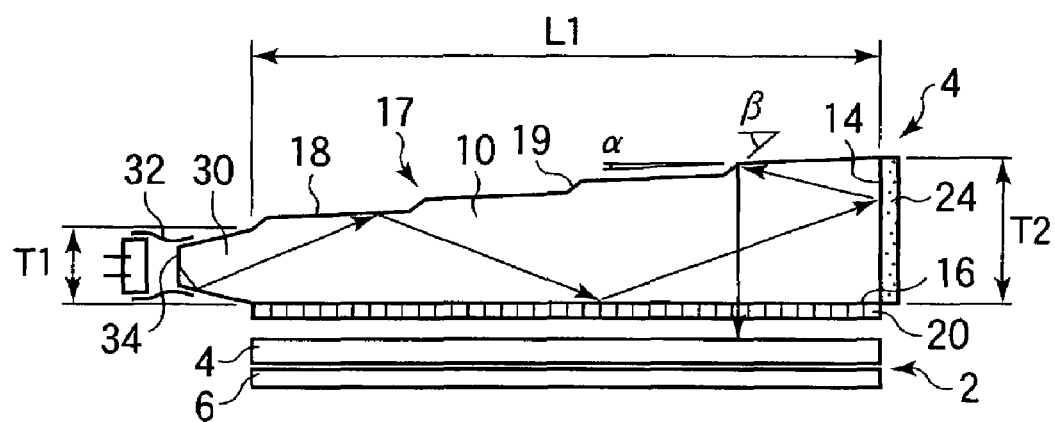
FIG. 6 is a view illustrating the constitutions of the light guide plate, the light source device equipped therewith and the display device according to Example 1-4 of the first embodiment of the invention.
Figure 7:
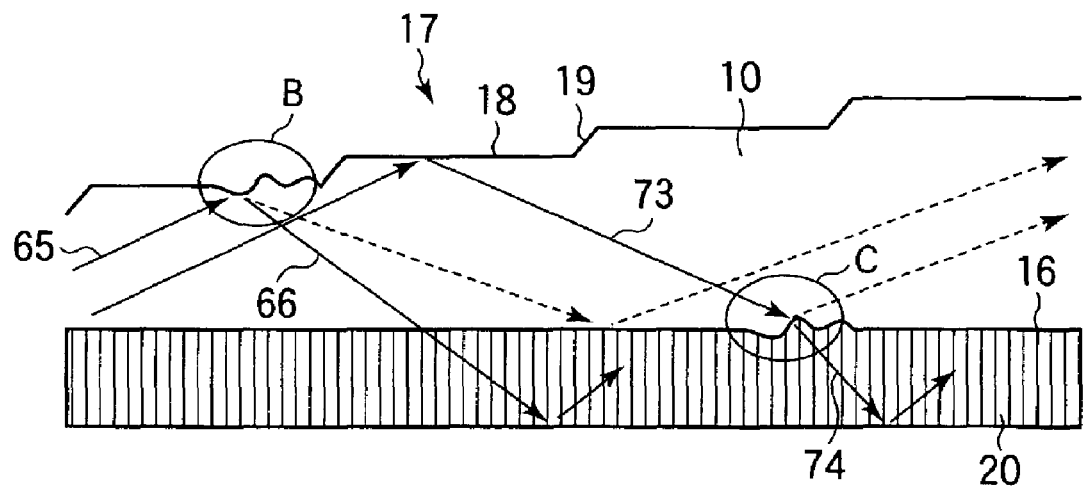
FIG. 7 is a view illustrating the constitutions of the light guide plate, the light source device equipped therewith and the display device according to Example 1-4 of the first embodiment of the invention.

Next, the light guide plate, light source device equipped therewith and display device according to Example 1-4 of the embodiment will be described with reference to FIGS. 6 and 7. FIG. 6 illustrates, in cross section, the constitutions of the light guide plate, light source device equipped therewith and display device according to the Example. Constituent elements having the same functions and actions as those of the constituent elements of the light guide plate, light source device equipped therewith and display device of Examples 1-1 to 1-3, are denoted by the same reference numerals but their description is not repeated. As shown in FIG. 6, the light guide plate 10 according to this Example has a feature in that the first opposing surfaces 18 are inclined so as to become lower toward the light incidence surface 34. The angle α of inclination of the first opposing surfaces 18 with respect to the light outgoing surface 16 is $0° \leq \alpha \leq 1°$, and is 0.5° in this Example. The angle β of inclination of the second opposing surfaces 19 with respect to the light outgoing surface 16 is, for example, 40°.

The light guide plate 10 has a length L1 of, for example, 76 mm, a width W1 of, for example, 59 mm, a thickness T1 of, for example, 1.0 mm and a thickness T2 of, for example, 1.9 mm like the light guide plate 10 of Example 1-1 shown in FIG. 1A.

The light guide plate 10 of this Example solves the problem of a drop in the light utilization efficiency of when the first opposing surfaces 18 and the light outgoing surface 16 have low degree of flatness in the structure of the light guide plate 10 of Example 1-2. The reason why the light utilization efficiency drops will be described with reference to FIG. 7 which is a view illustrating, on an enlarged scale, a portion of the light guide plate 10 according to Example 1-2 shown in FIG. 2B. Regions B and C have low degrees of flatness. The ray 65 of light totally reflected in the light guide plate 10 falls on the region B and is reflected in a predetermined direction depending upon the angle of inclination of fine ruggedness on the surface of the first opposing surfaces 18. Here, there is formed a ray 66 of light of which the angle of incidence to the light outgoing surface 16 is smaller than the critical angle. Due to the circularly polarizing plate 20 that is intimately adhered, the light outgoing surface 16 exhibits the critical angle greater than that of the first opposing surfaces 18. Therefore, even a fine change in the angle of incidence results in the collapse of the totally reflecting condition, and the ray 66 of light passes through toward the circularly polarizing plate 20. Further, if the light outgoing surface 16 is flat, the ray 73 of light that is totally reflected passes through as the ray 74 of light toward the circularly polarizing plate 20 since the totally reflecting condition is collapsed due to the inclination by fine ruggedness on the light outgoing surface 16 in the region C. The ray 66 of light incident on the circularly polarizing plate 20 is absorbed by the circularly polarizing plate 20 and, hence, the light utilization efficiency drops.

In this Example as shown in FIG. 6, therefore, the first opposing surfaces 18 are formed being inclined at an angle of, for example, 0.5° with respect to the light outgoing surface 16, so that the first opposing surfaces 18 becomes lower on the side of the light incidence surface 34. Light incident on the light guide plate 10 travels toward the light reflection surface 14 while being totally reflected repetitively by the first opposing surfaces 18 and by the light outgoing surface 16. The first opposing surfaces 18 are arranged being inclined at an angle of 0.5° with respect to the light outgoing surface 16. Therefore, the ray of light undergoes a change by 1.0° in a direction in parallel with the light outgoing surface 16 every time when it is totally reflected by the first opposing surfaces 18. Therefore, even when there exist regions of a low degree of flatness like the regions B and C, the light continues to travel within the light guide plate 10 without any problem provided fine ruggedness has relatively small angles of inclination. Namely, even the light guide plate 10 having a low degree of flatness makes it possible to enhance the light utilization efficiently permitting light to be lost little.

In this Example, the angle α of inclination is set to be not larger than 1° since the thickness T2 of the light guide plate 10 on the side of the light reflection surface 14 is set to be smaller than the thickness T1 thereof on the side of the light incidence surface 34. It is, however, also allowable to set the angle α of inclination to be not smaller than 1° within a range which is tolerated by the thickness T2.

EXAMPLE 1-5

Figure 8:
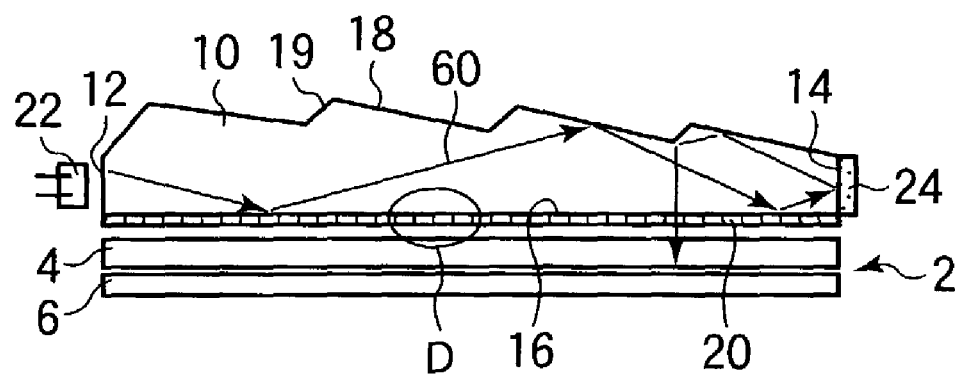
FIG. 8 is a view illustrating the constitutions of the light guide plate, the light source device equipped therewith and the display device according to Example 1-5 of the first embodiment of the invention.
Figure 9:
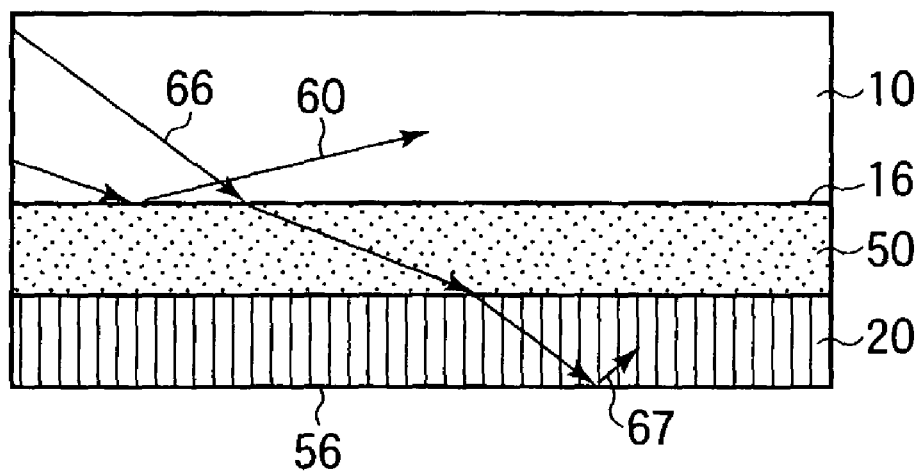
FIG. 9 is a view illustrating the constitutions of the light guide plate and the light source device equipped therewith according to Example 1-5 of the first embodiment of the invention.

Next, the light guide plate, light source device equipped therewith and display device according to Example 1-5 of the embodiment will be described with reference to FIGS. 8 to 11. FIG. 8 illustrates, in cross section, the constitutions of the light guide plate, light source device equipped therewith and display device according to the Example. FIG. 9 illustrates, on an enlarged scale, a region D of FIG. 8. Constituent elements having the same functions and actions as those of the constituent elements of the light guide plate, light source device equipped therewith and display device of Examples 1-1 to 1-4, are denoted by the same reference numerals but their description is not repeated. As shown in FIGS. 8 and 9, the light guide plate 10 according to this Example has first opposing surfaces 18 that are inclined so as to become lower toward the light reflection surface 14 and second opposing surfaces 19 that are inclined so as to become lower toward the light incidence surface 12. The angle of inclination of the first opposing surfaces 18 with respect to the light outgoing surface 16 is, for example, 2°, and the angle of inclination of the second opposing surfaces 19 with respect to the light outgoing surface 16 is, for example, 45°. As shown in FIG. 9, further, the circularly polarizing plate 20 is intimately stuck to the light outgoing surface 16 by using an adhesive agent 50. That is, the light outgoing surface 16 is an interface between the PMMA and the adhesive agent 50 (having a refractive index of, for example, 1.34) which is a layer of a low refractive index, and the critical angle on the light outgoing surface 16 is 64.15°. The critical angle of the first opposing surfaces 18 is 42.19° as described already. The circularly polarizing plate 20 is made of a material having a refractive index (e.g., 1.485) close to the refractive index of the PMMA, and the critical angle is 42.33° on the surface 56 of the circularly polarizing plate 20 which is the interface between circularly polarizing plate 20 and the air layer on the side of the liquid crystal display panel 2.

Referring to FIGS. 8 and 9, the ray 60 of light incident through the light incidence surface 12 travels while being totally reflected by the light outgoing surface 16 and by the first opposing surfaces 18. Here, however, the first opposing surfaces 18 are inclined at an angle of 2° with respect to the light outgoing surface 16 so as to become lower toward the light reflection surface 14. Therefore, the ray 60 of light is deviated from a direction which is in parallel with the light outgoing surface 16 by 4° every time when it is reflected by the first opposing surfaces 18, and the angles of incidence to the first opposing surfaces 18 and to the light outgoing surface 16 gradually decrease. In the constitution of this Example, the light outgoing surface 16 has a critical angle which is greater than that of the first opposing surfaces 18. Therefore, the ray 66 of light having small angles of incidence to the first opposing surfaces 18 and to the light outgoing surface 16, becomes no longer totally reflected by the light outgoing surface 16 earlier than by the first opposing surfaces 18. The ray 66 of light refracted by the light outgoing surface 16 falls on the circularly polarizing plate 20 through the layer 50 having a low refractive index, and becomes a ray of light circularly polarized in a predetermined direction. The surface (lower side in the drawing) of the circularly polarizing plate 20 on the side of the liquid crystal display panel 2 is in contact with the air, and the ray 66 of light is nearly totally reflected by the surface 56 of the circularly polarizing plate 20. The ray 67 of light totally reflected becomes a ray of circularly polarized light which is reverse to the ray 66 of light, and is absorbed by the circularly polarizing plate 20. According to this Example, therefore, no light is emitted from the first opposing surfaces 18 toward the display screen, and a drop in the contrast is suppressed.

Figure 10:
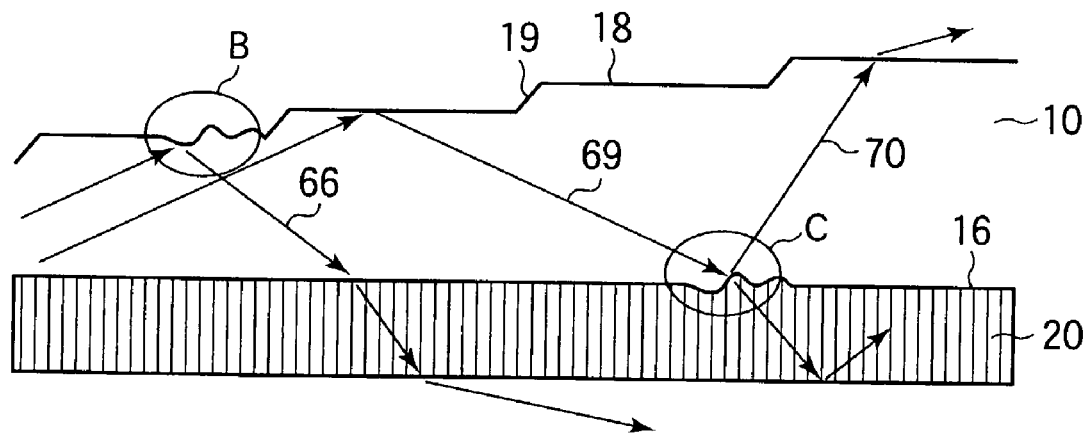
FIG. 10 is a view illustrating a modified constitution of the light guide plate according to Example 1-5 of the first embodiment of the invention.
Figure 11:
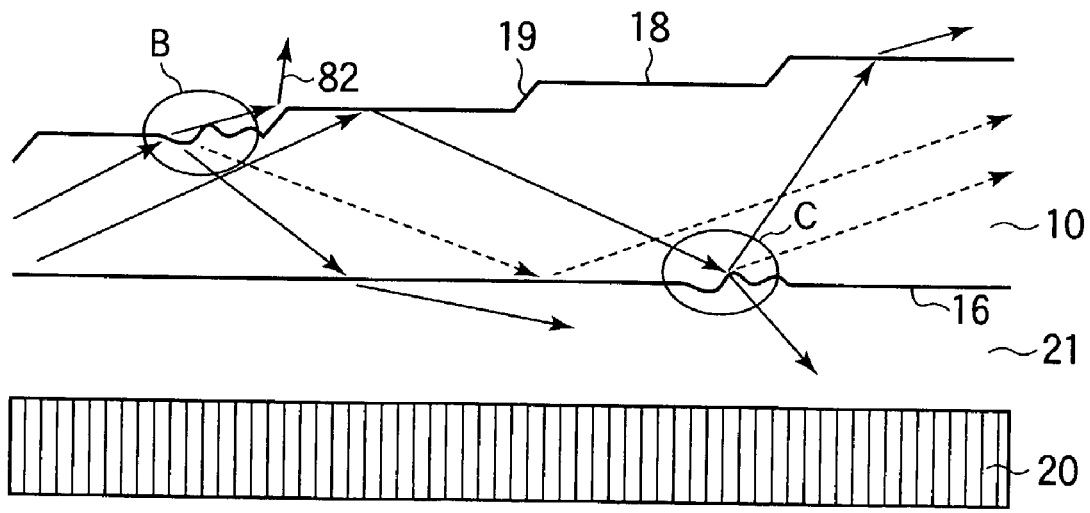
FIG. 11 is a view illustrating a modified constitution of the light guide plate according to Example 1-5 of the first embodiment of the invention.

FIG. 10 is a view illustrating a modified constitution of the light guide plate according to this Example, and FIG. 11 is a view of Comparative Example for illustrating the modified light guide plate. In the modified Example shown in FIG. 10, the first opposing surfaces 18 are nearly in parallel with the light outgoing surface 16. In this constitution, the angle of incidence of the ray of light does not become gradually small. However, there exist regions having a low degree of flatness like the regions B and C. The ray 66 of light is reflected by the regions B and C having a low degree of flatness in a direction in which the angle of incidence to the light outgoing surface 16 and to the first opposing surfaces 18 decreases, emitted from the light guide plate 10 through the light outgoing surface 16 earlier than through the first opposing surfaces 18, and is absorbed by the circularly polarizing plate 20. Unlike the conventional constitution in which the light outgoing surface 16 is the interface between the light guide plate 10 and the air layer 21 shown in FIG. 11, therefore, the ray 82 of light according to this Example is not emitted toward the display screen, and a drop in the contrast is suppressed. Further, since a difference in the refractive index on the light outgoing surface 16 is small due to the circularly polarizing plate 20 that is intimately stuck to the light outgoing surface 16, the intensity of ray 70 of light formed from the ray 69 of light reflected by the light outgoing surface 16 of the region C, becomes about 1/10 to 1/100 of the intensity of the ray 69 of light. Therefore, a drop in the contrast is suppressed.

EXAMPLE 1-6

Figure 12A:
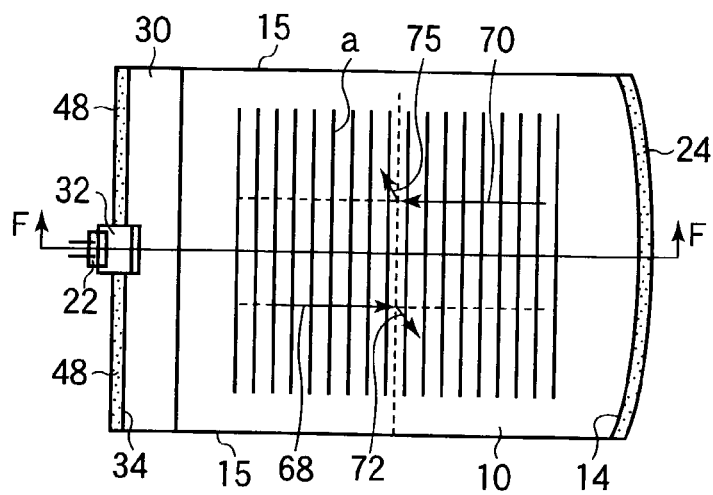
FIGS. 12A to 12D are views illustrating the constitutions of a conventional light guide plate and a light source device equipped therewith which served as a prerequisite of Example 1-6 of the first embodiment of the invention.
Figure 12B:
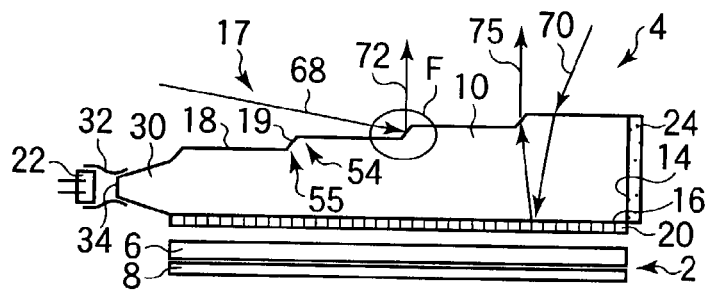
Figure 12C:
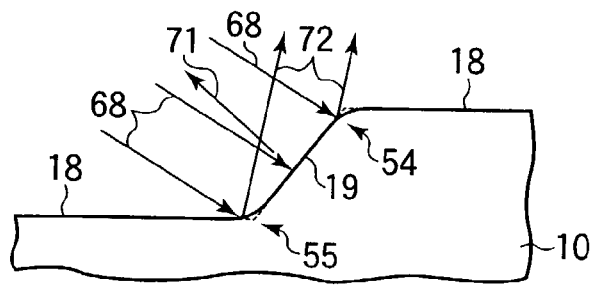
Figure 12D:
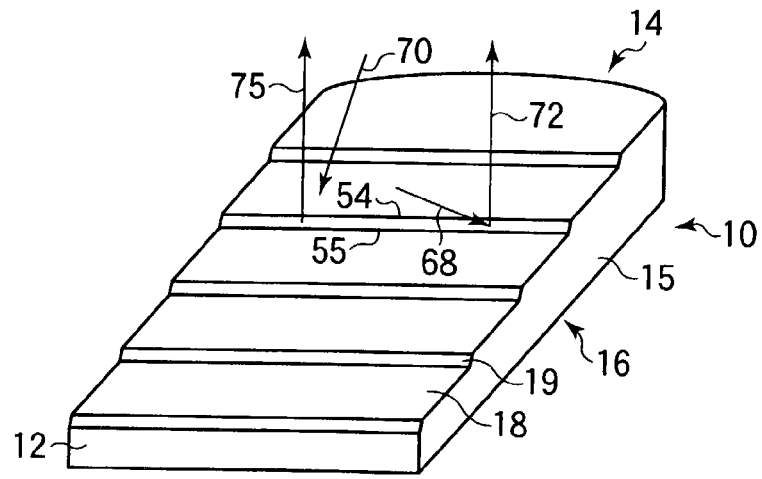

Next, the light guide plate, light source device equipped therewith and display device according to Example 1-6 of the embodiment will be described with reference to FIGS. 12A to 15. First, described below are the light guide plate, light source device equipped therewith and display device according to Example 1-2 which serves as a prerequisite of this Example. FIGS. 12A to 12D are the views illustrating the constitutions of the light guide plate, light source device equipped therewith and display device according to Example 1-2. FIG. 12A is a view illustrating the constitution of the display device of Example 1-2 as viewed from the side of the display screen, FIG. 12B is a sectional view of the display device cut along the line F—F in FIG. 12A, and FIG. 12C illustrates, on an enlarged scale, the region F of FIG. 12B. FIG. 12D is a perspective view schematically illustrating the constitution of the light guide plate of this Example. Constituent elements having the same functions and actions as those of the constituent elements of the light guide plate, light source device equipped therewith and display device of Examples 1-1 to 1-5, are denoted by the same reference numerals but their description is not repeated. As shown in FIGS. 12A to 12D, the light guide plate 10 is such that the direction a of extension of corner portions 54, 55 formed by the first opposing surfaces 18 and by the second opposing surfaces 19 is in parallel with the light incidence surface 34. When the light is incident from the outer side aslant with respect to the direction perpendicular to the display screen, there takes place the reflection on the surface of the light guide plate 10. However, the light reflected by the surface of the light guide plate 10 goes out in a regularly reflected direction having an angle of reflection equal to the angle of incidence. When observed from a direction nearly perpendicular to the display screen, therefore, it is considered that the quality of display is not affected.

Referring, for example, to FIG. 12C, the ray 68 of light falling on the second opposing surface 19 aslant with respect to the direction perpendicular to the display screen, reflects as a ray 71 of light without arousing any problem. However, the corner portions 54, 55 at where the first opposing surfaces 18 and the second opposing surfaces 19 are neighboring, are formed like a fillet due to machining precision. Therefore, the ray 68 of light incident from the outer side on the corner portions 54, 55 is reflected over a wide range of angles, and is emitted as a ray 72 of light even to the direction of a viewer nearly perpendicular to the display screen. Therefore, the contrast of the display device drops.

Further, part of the ray 70 of light incident from the outer side on the first opposing surface 18 is reflected by the light outgoing surface 16, by the interface in the circularly polarizing plate 20, by the interface between the circularly polarizing plate 20 and the air, or by the interface between the air and the substrate 6, is further refracted by the second opposing surfaces 19, and is emitted as a ray 75 of light in the direction nearly perpendicular to the display screen. The reflection factors on these interfaces are from about 0.01 to about 0.001%, and the quantity of the ray 75 of light is very small which, however, is nearly equal to the quantity of light reflected in a direction nearly perpendicular to the display screen when black is displayed on the reflection type liquid crystal display panel 2, becoming a cause of drop in the contrast. When the external light is incident chiefly from a direction perpendicular to the incidence surface 34, i.e., from the direction same as the ray 68 of light in really using the display device and, particularly, when the corner portions 54, 55 are extending in the direction a which is in parallel with the incidence surface 34, then, the ray 75 of light is emitted in a direction nearly perpendicular to the display screen.

Figure 13A:
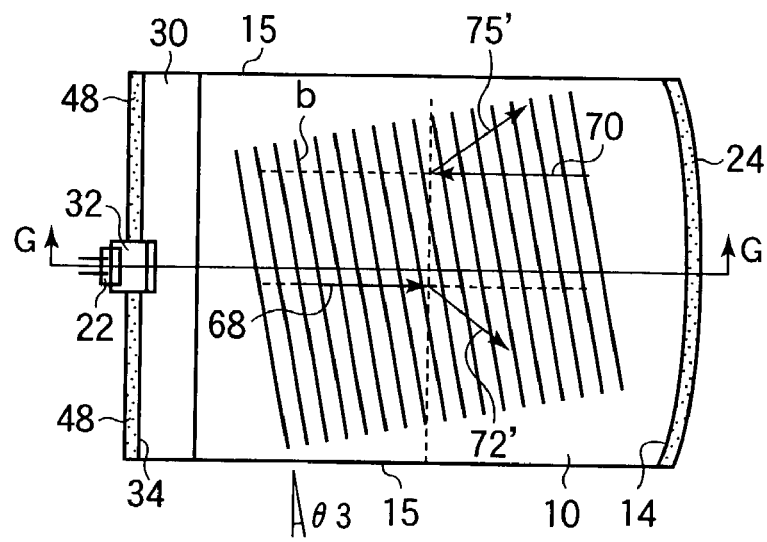
FIGS. 13A to 13C are views illustrating the light guide plate and the light source device equipped therewith according to Example 1-6 of the first embodiment of the invention.
Figure 13B:
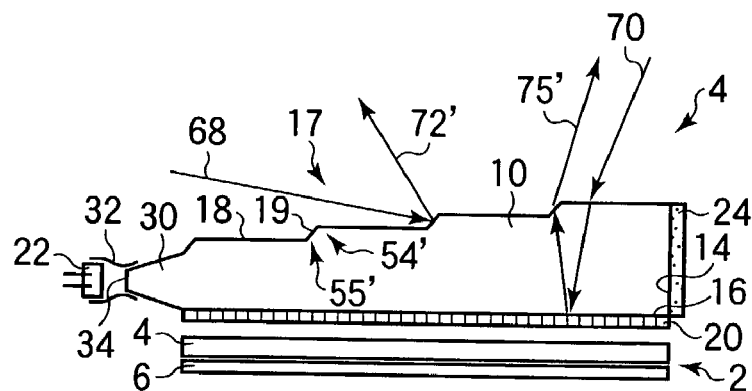
Figure 13C:
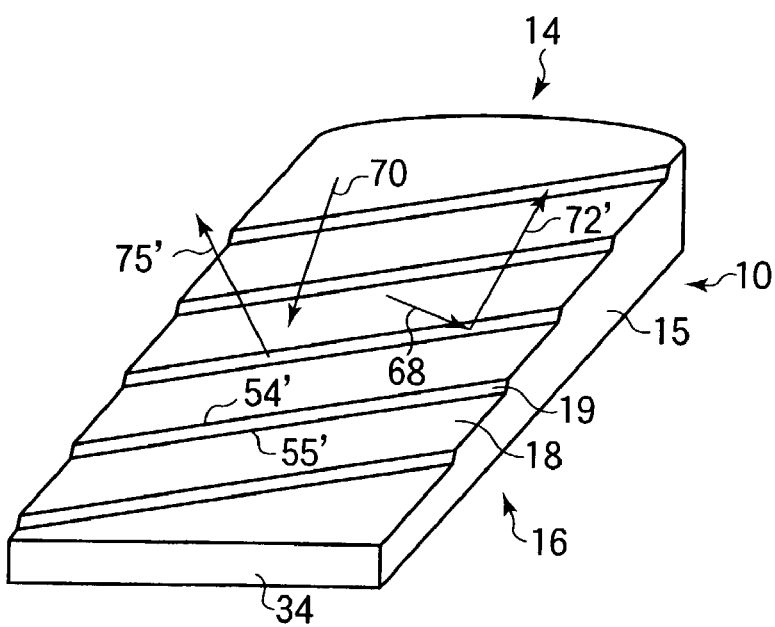

Next, the light guide plate, light source device equipped therewith and display device according to this Example will be described. FIGS. 13A to 13C are the views illustrating the constitutions of the light guide plate, light source device equipped therewith and display device according to the Example. FIG. 13A is a view illustrating the constitution of the display device of the Example as viewed from the side of the display screen, FIG. 13B is a sectional view of the display device cut along the line G—G in FIG. 13A, and FIG. 13C is a perspective view schematically illustrating the constitution of the light guide plate according to the Example. Constituent elements having the same functions and actions as those of the constituent elements of the light guide plate, light source device equipped therewith and display device of Examples 1-1 to 1-5, are denoted by the same reference numerals but their description is not repeated. As shown in FIGS. 13A to 13C, in this Example, the first opposing surfaces 18 and the second opposing surfaces 19 are so arranged that the direction b of extension of the corner portions 54', 55' formed by the first opposing surfaces 18 and by the second opposing surfaces 19 is inclined by an angle θ3 with respect to the light incidence surface 34. Therefore, the ray 72' of light that is formed as the ray 68 of light is reflected by the corner portions 54', 55', is no longer emitted in the direction nearly perpendicular to the display screen. Besides, the ray 75' of light formed as the ray 70 of light is reflected by the light outgoing surface 16 and is refracted by the second opposing surfaces 19, is no longer emitted in the direction nearly perpendicular to the display screen.

Figure 14:
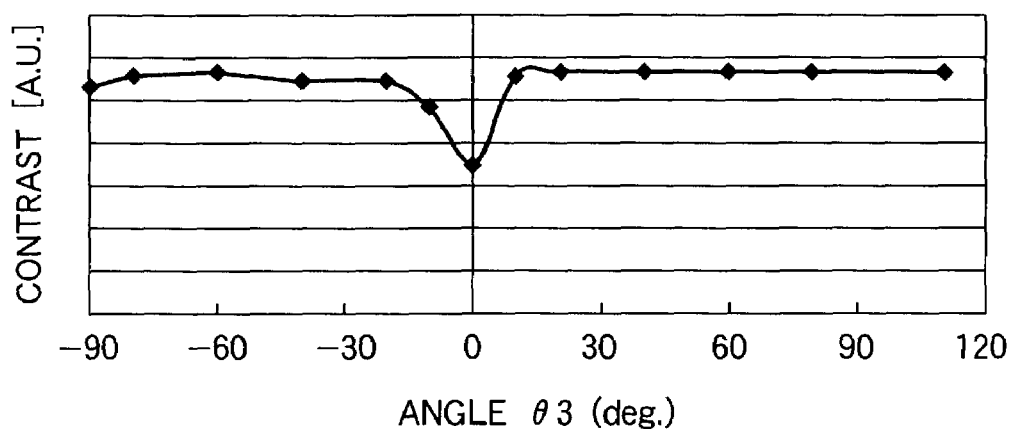
FIG. 14 is a graph illustrating a change in the contrast depending upon the angle between the direction in which the corner portions extend and the light incidence surface.

FIG. 14 is a graph illustrating a change in the contrast due to the angle θ3 between the direction b of extension of the corner portions 54', 55' and the light incidence surface 34, and wherein the abscissa represents the angle θ3 (deg.) between the direction b of extension of the corner portions 54', 55' and the light incidence surface 34, and the ordinate represents the contrast (A.U.: arbitrary unit). The direction of incidence of light is on the side of the light incidence surface 34 of the display screen and is 30° (angle of incidence of 30°) over the normal to the display screen. A brightness meter is arranged in a direction perpendicular to the display screen. Referring to FIG. 14, the contrast increases with an increase in the absolute value of the angle θ3. A favorable contrast is obtained particularly when the absolute value of the angle θ3 is selected to be not smaller than 10° and, desirably, not smaller than 20°.

Figure 15:
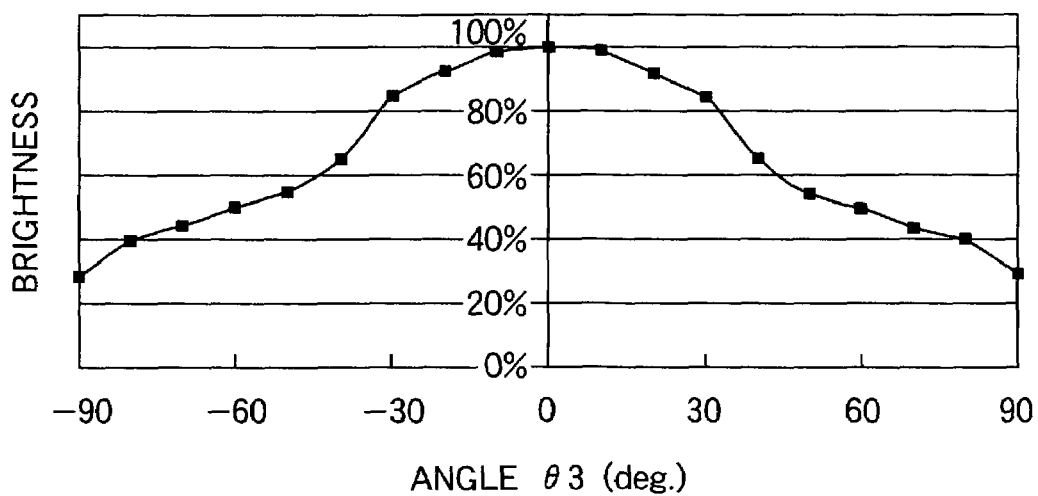
FIG. 15 is a graph illustrating a relationship between the change in the brightness and the angle between the direction in which the corner portions extend and the light incidence surface.

FIG. 15 is a graph illustrating a relationship between the brightness on the front surface of the display screen of when it is illuminated by the light source device 4 and the angle θ3 between the direction b of extension of the corner portions 54', 55' and the light incidence surface 34, and wherein the abscissa represents the angle θ3 (deg.) between the direction b of extension of the corner portions 54', 55' and the light incidence surface 34, and the ordinate represents the brightness on the front surface of the display screen of when it is illuminated by the light source device 4 with the brightness of when θ3=0° as a reference. It will be understood from FIG. 15 that the brightness decreases with an increase in the absolute value of the angle θ3. In particular, the brightness sharply decreases as the absolute value of the angle θ3 becomes greater than 30°. This is because as the absolute value of the angle θ3 increases, light is no longer efficiently emitted in the direction nearly perpendicular to the display screen at the time when the light from the LED 22 is emitted toward the liquid crystal display panel 2 through the light guide plate 10.

According to this Example as described above, there are realized the light guide plate, light source device equipped therewith and display device maintaining brightness, high contrast and good display quality.

Second Embodiment

Next, described below with reference to FIGS. 16A to 21C are the light guide plate and light source device equipped therewith according to a second embodiment of the invention. As described already with reference to FIGS. 22A and 22B, the conventional light source device has a linear light guide plate 106 arranged along one side of the planar light guide plate 104, and has LEDs 108 arranged at both ends of the linear light guide plate 106. The rays of light emitted from the LEDs 108 propagate through the linear light guide plate 106, emitted from the side surface of the linear light guide plate 106, and fall on the planar light guide plate 104 through the light incidence surface 122. Light incident on the planar light guide plate 104 is reflected by steeply inclined surfaces 110, and is emitted toward the liquid crystal display panel 102 from the light outgoing surface 128.

The planar light guide plate 104 is used for a back-light type light source device having a diagonal distance of about 2 inches for a display device of a cell phone using two LEDs 108 as sources of light, and is further used for a front-light type light source device having a diagonal distance of about 3 inches for a display device of a PDA (personal digital assistant) using four LEDs 108 as sources of light.

However, the LEDs 108 have a light-emitting efficiency lower than that of a cold cathode tube, and with which it is difficult to obtain a highly bright light source device. An increased current may be supplied to the LEDs 108 in order to obtain a highly bright light source device by using the LEDs 108. When an increased current is supplied to the LEDs 108, however, the ambient temperature is elevated due to heat generated by the LEDs 108, whereby a metal wears due to thermal distortion between the wiring metal and an organic material used as junction protection members surrounding the light source device and, besides, organic materials used as a package, a junction protection member and a paste are thermally deteriorated at an early time. Due to the generation of visible light of short wavelengths, further, the plastic packages of the LEDs 108 are deteriorated at an early time, become opaque within short periods of time, and the life of the display device is shortened.

In order to obtain a highly bright light source device, further, the LEDs 108 may be provided in an increased number. In the conventional light source device, however, the LEDs 108 are arranged at both ends of the linear light guide plate 106. In order to arrange three or more LEDs 108, therefore, at least two or more LEDs 108 must be arranged near one end of the linear light guide plate 106. When a plurality of LEDs 108 are arranged close to each other, however, the ambient temperature of the LEDs 108 is elevated, and the metal wears due to thermal distortion and the organic materials are thermally deteriorated like those described above.

Further, the LEDs 108 have a problem in that their brightness varies to a very large extent depending upon the products. Due to problems involved in the steps of producing the LED chips, the difference in the brightness is, usually, as great as 2 to 3 times between the highly bright LED 108 and the lowly bright LED 108, but the sorting is not realistic since it greatly drives up the cost and arouses a problem of lack of quantity. When the LEDs 108 are arranged at both ends of the linear light guide plate 106, therefore, the brightness is often irregularly distributed in the light source device, and the display characteristics of the display device are deteriorated.

The object of this embodiment is to provide a display device which features a long life and excellent display characteristics, as well as to provide a light source device used therefor.

In order to solve the above problem according to this embodiment, a plurality of LEDs are arranged maintaining a predetermined distance at one end of the planar light guide plate, and rays of light from the neighboring LEDs are mixed together and are emitted from the light outgoing surface of the planar light guide plate. Hereinafter, the light source device and a display device equipped therewith according to this embodiment will be concretely described with reference to Examples 2-1 to 2-4.

EXAMPLE 2-1

Figure 16A:
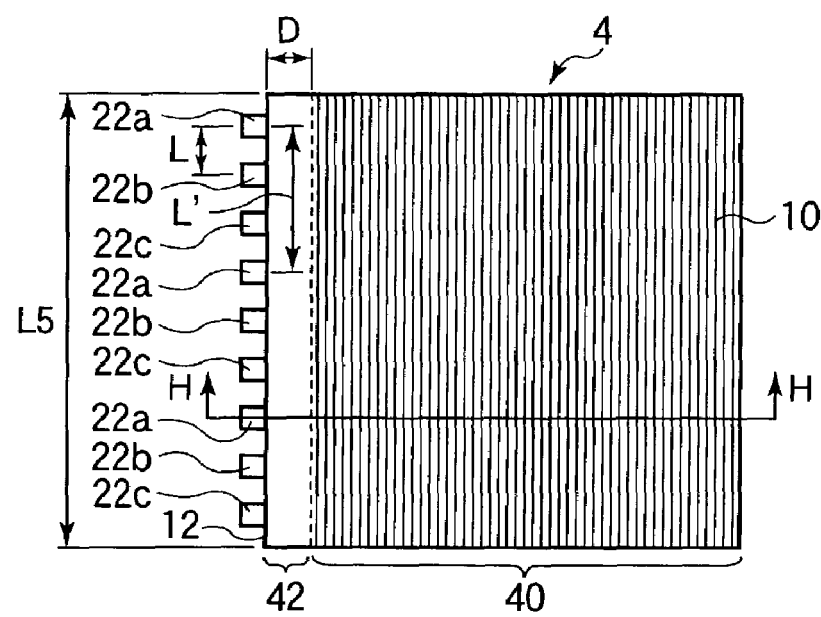
FIGS. 16A and 16B are diagrams illustrating the constitution of the light source device according to Example 2-1 of a second embodiment of the invention.
Figure 16B:
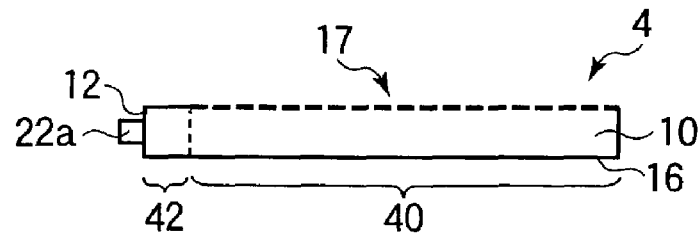
Figure 17:
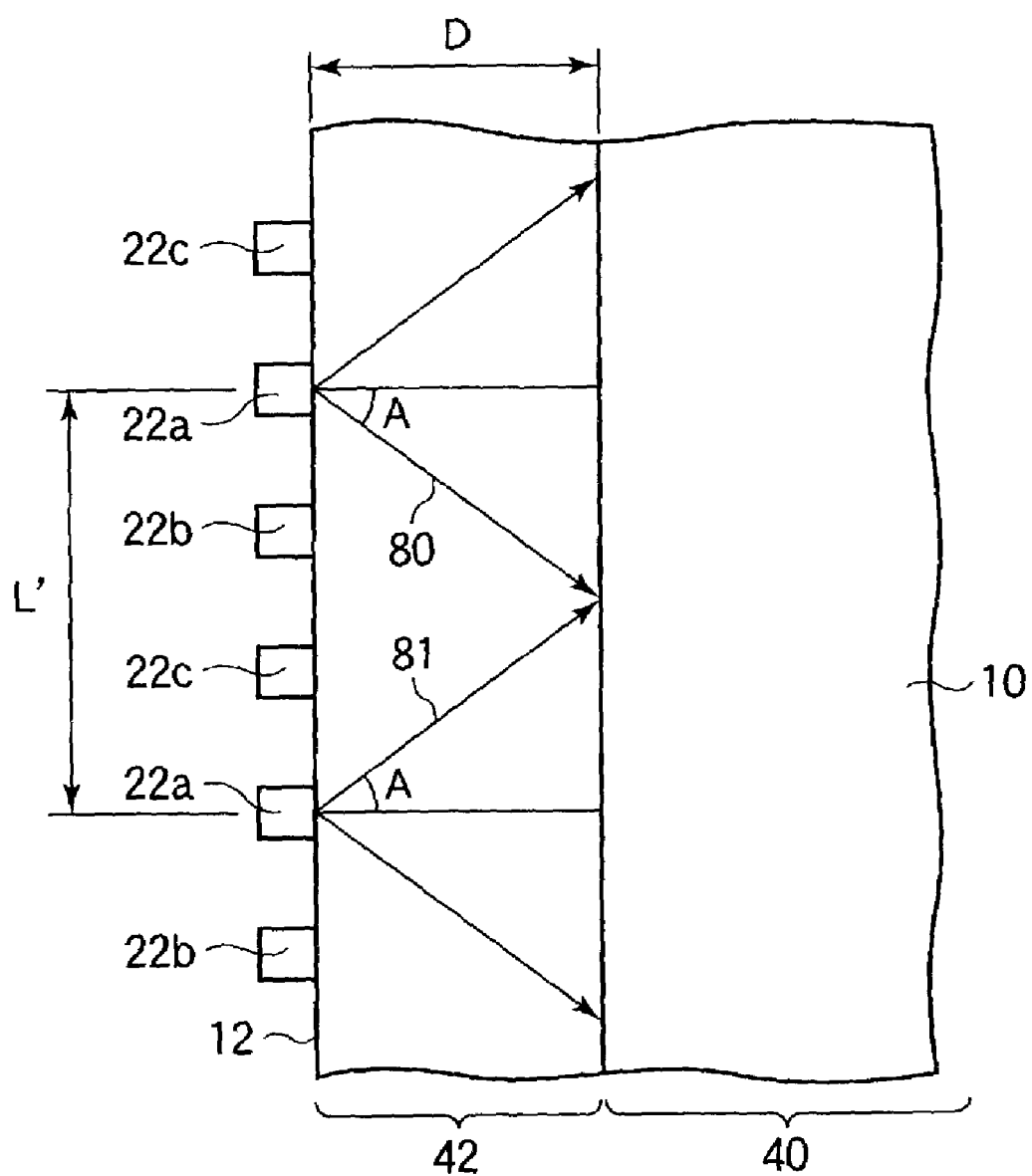
FIG. 17 is a diagram illustrating the operation of the light source device according to Example 2-1 of the second embodiment of the invention.

First, the light source device and the display device equipped therewith according to Example 2-1 of the embodiment will be described with reference to FIGS. 16A to 17. FIGS. 16A and 16B illustrate the constitution of the light source device according to this Example. FIG. 16A is a view illustrating the light source device as viewed from the side of the display screen, and FIG. 16B is a sectional view of the light source device cut along the line H—H in FIG. 16A. FIG. 17 is a view illustrating on an enlarged scale an end portion of the light source device. Referring to FIGS. 16A and 16B, the light source device 4 has a light guide plate 10 and a plurality of LEDs 22*a*, 22*b*, 22*c* successively arranged maintaining a predetermined distance L at one end of the light guide plate 10. The LED 22*a* emits red light, the LED 22*b* emits green light, and the LED 22*c* emits blue light. The rays of light from a set of LEDs 22*a*, 22*b* and 22*c* are mixed together to form white light. In this Example, there are arranged six sets of LEDs 22*a*, 22*b* and 22*c*, or a total of 18 LEDs 22*a*, 22*b* and 22*c* (FIG. 16A illustrates only three sets of (nine) LEDs 22*a*, 22*b* and 22*c*).

The light guide plate 10 has a planar light source region 40 for emitting light from the light outgoing surface 16 to the liquid crystal display panel 2 (not shown in FIGS. 16A and 16B). An opposing surface (prism array) 17 is formed on the planar light source region 40 on the side of the display screen to reflect light traveling through the light guide plate 10 toward the light outgoing surface 16. Further, a light-mixing region 42 is provided at the end side of the light guide plate 10 on the side where the LEDs 22*a*, 22*b* and 22*c* are arranged so will not to emit light toward the liquid crystal display panel 2 but to mix the rays of light emitted from the plurality of LEDs 22*a*, 22*b* and 22*c* together and to emit them toward the planar light source region 40.

The distance L among the neighboring LEDs 22*a*, 22*b* and 22*c* is about 2.8 mm, and the distance L' between the LEDs 22*a* (or 22*b* or 22*c*; hereinafter denoted by reference numeral 22) emitting light of the same color is about 8.4 mm. The length L5 of the light-mixing region 42 in the direction of long side is about 50 mm. The half-brightness angle of light emitted from the LEDs 22*a*, 22*b* and 22*c* (light outgoing angle at which not less than one-half of a maximum brightness is obtained) is roughly from 65° to 80° in the air. As shown in FIG. 17, further, the half-brightness angle A of when light falls on the light guide plate 10 of PMMA is about 35° to 38°. When the rays 80, 81 of light from the LEDs 22 of the same color arranged maintaining the distance L' are mixed together on the interface between the light-mixing region 42 at a distance D from the LED 22 and the planar light source region 40 within a range of the half-brightness angle A, it is allowed to suppress the occurrence of dispersion in the brightness of light emitted from the planar light source region 40 to the liquid crystal display panel 2 and to suppress the color shading. That is, the distance L', width D and half-brightness angle A should satisfy the formula 1, $$D > (L'/2) \times \cot A \tag{1}$$

In this Example, the width D of the light-mixing region 42 is set to be from 5.5 mm to 6.2 mm (e.g., 6 mm).

In this embodiment, a current of 40 mA is supplied to the red LED 22a, a current of 25 mA is supplied to the green LED 22b and a current of 25 mA is supplied to the blue LED 22c to realize a planar source of light of a brightness of 3000 cd/m² from which dispersion in the brightness and color shading cannot be perceived. When this light source device 4 is applied to a display device (e.g., QVGA having a diagonal distance of, for example, 3.5 inches) having a liquid crystal display panel of the vertically oriented (VA) mode, there is realized the light source having a display brightness of not smaller than 200 cd/m² featuring a life of several tens of thousands of hours.

Though this example uses three kinds of LEDs 22a, 22b and 22c emitting rays of monochromatic light of different colors, it is also allowable to use a so-called "3-in-1 type" LED including three kinds of LED chips as a package, or an LED of a combination of LED chips emitting blue light and ultraviolet rays with a fluorescent material. In using an LED of the "3-in-1 type", when the distance L between the neighboring LEDs is, for example, 8.3 mm, the angle of emission from the LED is dispersed nearly equally to the LEDs 22a, 22b and 22c that emit rays of monochromatic light used in this Example. Therefore, the light-mixing region 42 may have a width D which is about 6 mm like in this Example.

In this Example, when the LEDs of a relatively high brightness are placed at the center of the region where the light source is arranged and the LEDs are arranged having decreasing brightness toward the ends of the region, the dispersion in the brightness becomes smooth toward both ends of the planar light source region 40, and there is realized illumination of a high quality from which color shading is not perceived.

EXAMPLE 2-2

Figure 18A:
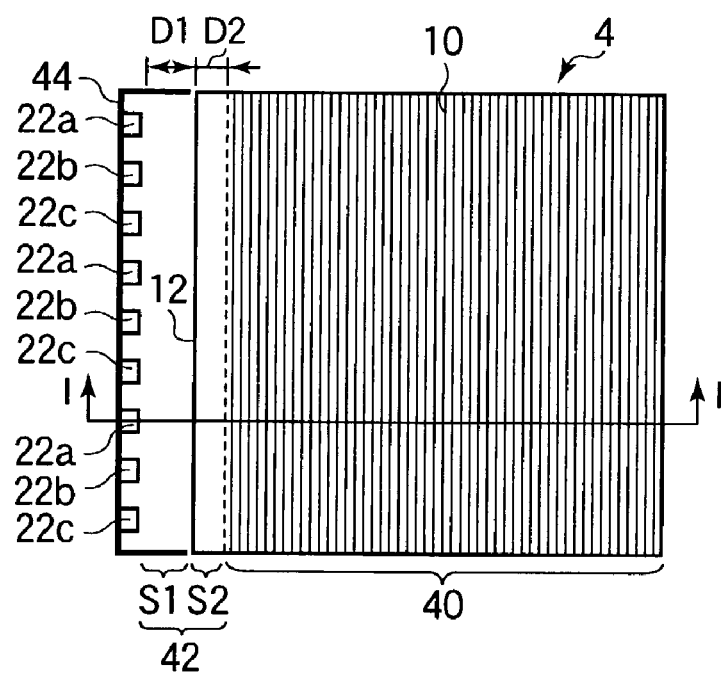
FIGS. 18A and 18B are diagrams illustrating the constitution of the light source device according to Example 2-2 of the second embodiment of the invention.
Figure 18B:
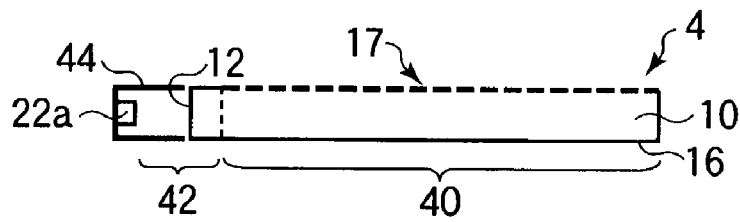
Figure 19:
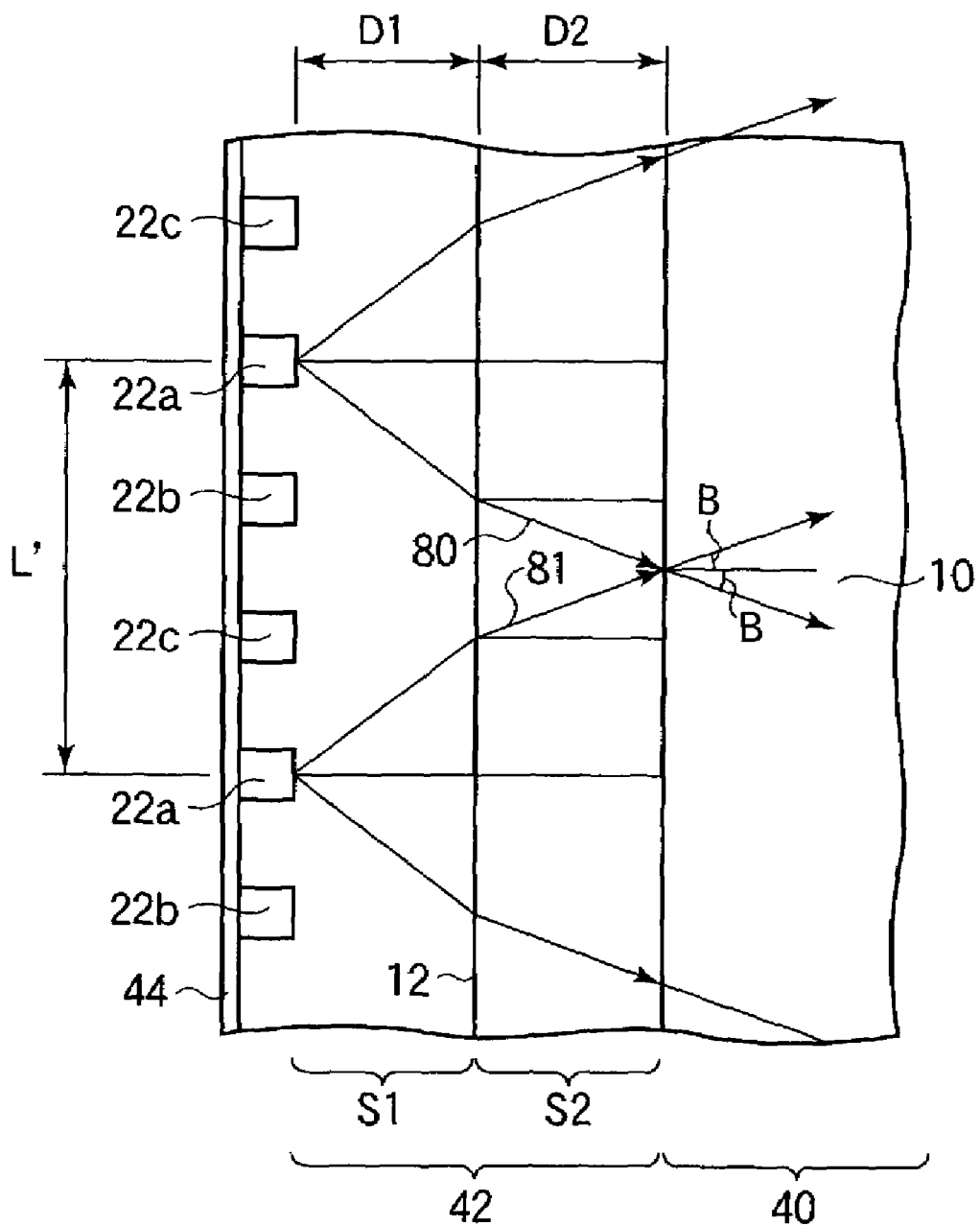
FIG. 19 is a diagram illustrating the operation of the light source device according to Example 2-2 of the second embodiment of the invention.

Next, the light source device according to Example 2-2 of the embodiment will be described with reference to FIGS. 18A to 19. FIGS. 18A and 18B illustrate the constitution of the light source device according to this Example. FIG. 18A is a view illustrating the light source device as viewed from the side of the display screen, and FIG. 18B is a sectional view of the light source device cut along the line I—I in FIG. 18A. FIG. 19 is a view illustrating on an enlarged scale an end portion of the light source device. The constituent elements having the same functions and actions as those of the constituent elements of the light source device of Example 2-1 are denoted by the same reference numerals but their description is not repeated. In this Example as shown in FIGS. 18A and 18B, the light-mixing region 42 includes, in a direction in which light travels, a region S1 (e.g., air layer) surrounded by a reflector (reflection plate) 44 and a region S2 which is an end side where the LEDs 22a, 22b and 22c are arranged in the light guide plate 10.

In this embodiment, too, if the rays 80, 81 of light from the LEDs 22 of the same color arranged maintaining a distance L' are mixed together on the interface between the light-mixing region 42 and the planar light source region 40, it is allowed to suppress the occurrence of dispersion in the brightness of light emitted from the planar light source region 40 to the liquid crystal display panel 2 and color shading.

Here, the refractive index of the region S1 relative to the planar light source region 40 is denoted by N1, and the refractive index of the region S2 relative to the planar light source region 40 is denoted by N2. Further, a half-brightness angle of light incident on the planar light source region 40 from the LEDs 22a, 22b and 22c is denoted by B. The distance L', refractive indexes N1 and N2, widths D1 and D2 and half-brightness angle B should satisfy the following relationship according to Snell's law, $$(D1 \times \sin B/((N1^2-(\sin B)^2)^{1/2}) + (D2 \times \sin B/((N2^2-(\sin B)^2)^{1/2}) > L'/2$$

In this Example, for example, the width D1 of the region S1 is selected to be about 2 mm and the width D2 of the region S2 is selected to be about 1 mm to obtain the same effect as that of Example 2-1. If the light-mixing region 42 has n regions Sn in the direction in which light travels, then, the distance L', refractive index Nn at the region Sn, width Dn of the region Sn and half-brightness angle B should satisfy the following relationship, $$(D1 \times \sin B/((N1^2-(\sin B)^2)^{1/2}) + (D2 \times \sin B/((N2^2-(\sin B)^2)^{1/2}) + \cdots + (Dn \times \sin B/((Nn^2-(\sin B)^2)^{1/2}) > L'/2 \tag{2}$$

This Example needs a reflector 44 that was not used in Example 2-1. By using the air layer having a relatively small refractive index as the region S1, however, it is allowed to decrease the width (D1+D2) of the light-mixing region 42. It is therefore allowed to decrease the size of the light source device 4. In this Example, too, there may be used other kinds of LEDs in combination like in Example 2-1.

EXAMPLE 2-3

Figure 20A:
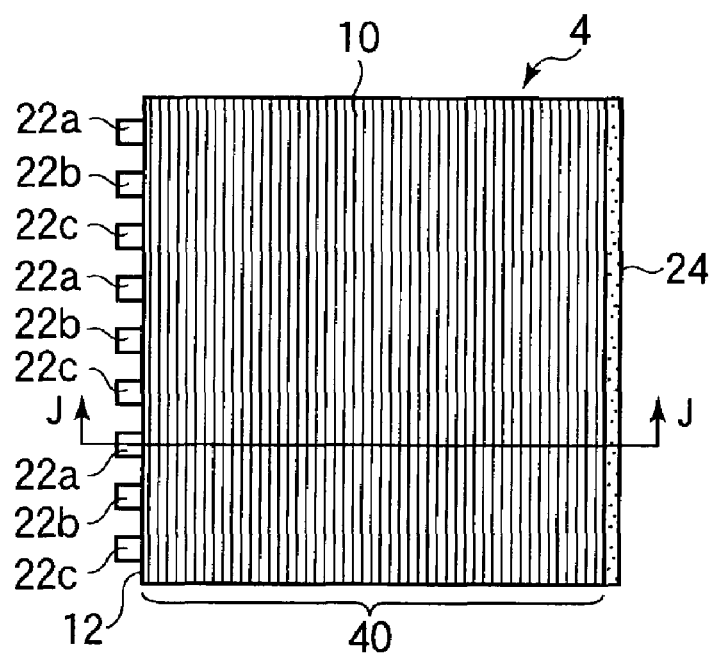
FIGS. 20A and 20B are diagrams illustrating the constitution of the light source device according to Example 2-3 of the second embodiment of the invention.
Figure 20B:
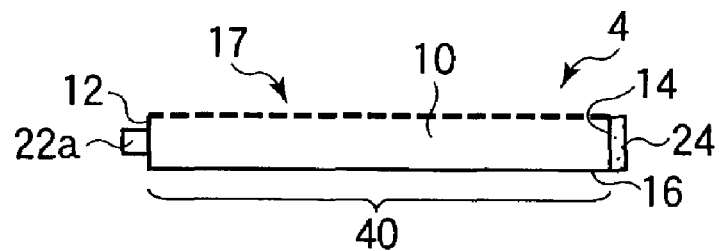

Next, the light source device according to Example 2-3 of the embodiment will be described with reference to FIGS. 20A and 20B. FIGS. 20A and 20B illustrate the constitution of the light source device according to this Example. FIG. 20A is a view illustrating the light source device as viewed from the side of the display screen, and FIG. 20B is a sectional view of the light source device cut along the line J—J in FIG. 20A. The constituent elements having the same functions and actions as those of the constituent elements of the light source device of Examples 2-1 and 2-2 are denoted by the same reference numerals but their description is not repeated. This Example uses the light guide plate 10 of a structure in which light travels reciprocally like that of Example 1-1 shown in FIGS. 1A to 1C. Rays of light emitted from the LEDs 22a, 22b and 22c incident on the light guide plate 10 through the light incidence surface 12, arrive at the light reflection surface 14 without being emitted to the liquid crystal display panel 2 from the light outgoing surface 16 of the light guide plate 10. The distance from the light incidence surface 12 to the light reflection surface 14 is longer than the widths D, Dn in Examples 2-1 and 2-2. Therefore, the rays of light from the LEDs 22 of the same color are mixed together to a sufficient degree until they arrive at the light reflection surface 14.

According to this Example, the planar light source region 40 having a length of from the light incidence surface 12 of the light guide plate 10 to the light reflection surface 14, substantially exhibits the function of the light-mixing region 42, making it possible to realize a light source device featuring even brightness and chromaticity as compared to those of Examples 2-1 and 2-2.

EXAMPLE 2-4

Figure 21A:
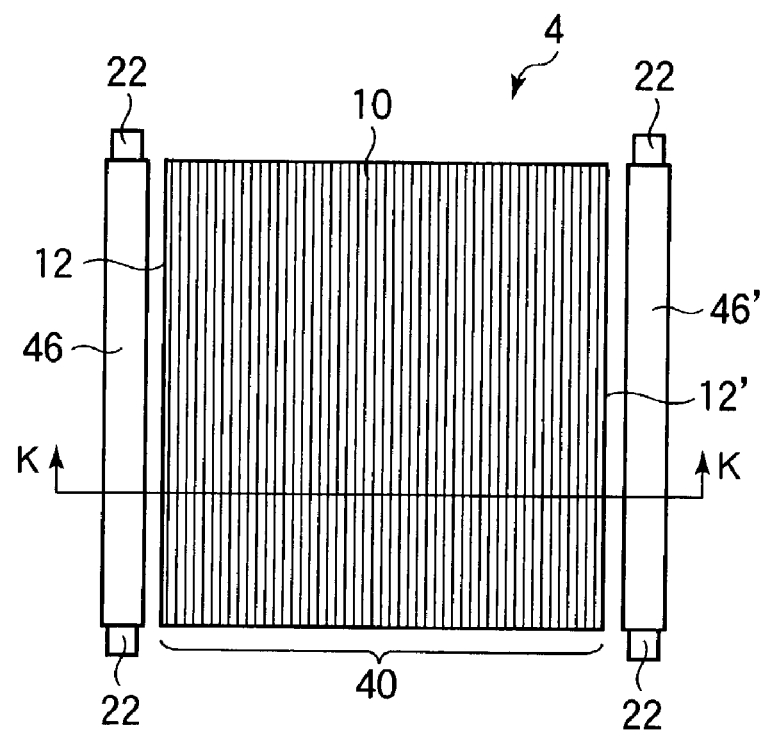
FIGS. 21A to 21C are diagrams illustrating the constitution of the light source device according to Example 2-4 of the second embodiment of the invention.
Figure 21B:
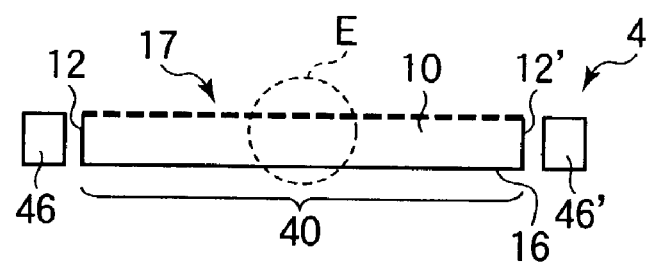
Figure 21C:
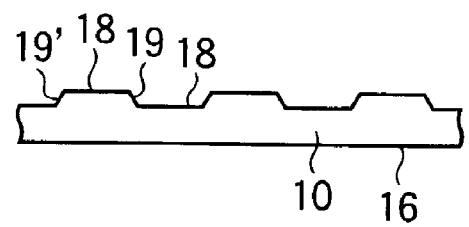
Figure 22A:
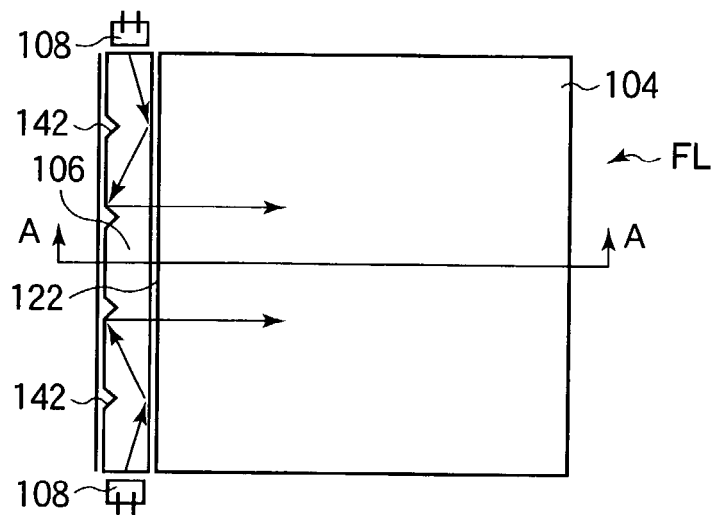
FIGS. 22A and 22B are diagrams illustrating the constitutions of a conventional light guide plate, a light source device equipped therewith and a display device.
Figure 22B:
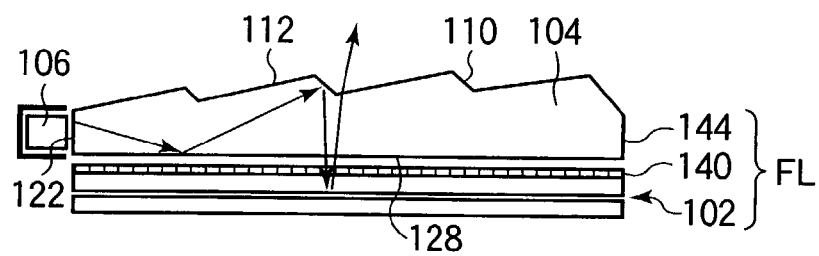
Figure 23:
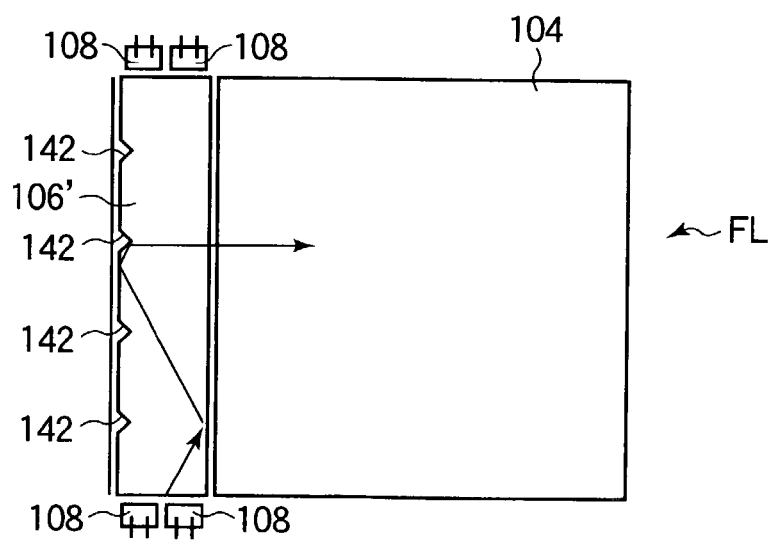
FIG. 23 is a diagram illustrating further constitutions of a conventional light guide plate and a light source device equipped therewith.

Next, the light source device according to Example 2-4 of the embodiment will be described with reference to FIGS. 21A to 21C. FIGS. 21A to 21C illustrate the constitution of the light source device according to this Example. FIG. 21A is a view illustrating the light source device as viewed from the side of the display screen, FIG. 21B is a sectional view of the light source device cut along the line K—K in FIG. 21A, and FIG. 21C illustrates the shape of the light guide plate 10 of a region E shown in FIG. 21B. The constituent elements having the same functions and actions as those of the constituent elements of the light source device of Examples 2-1 to 2-3 are denoted by the same reference numerals but their description is not repeated. As shown in FIGS. 21A and 21B, the light guide plate 10 of this Example has light incidence surfaces 12 and 12' at both ends. Further, a linear light guide plate 46 is arranged being opposed to the light incidence surface 12, and a linear light guide plate 46' is arranged being opposed to the light incidence surface 12'. LEDs 22 are arranged at both ends of the linear light guide plates 46 and 46'. The LEDs 22 and the linear light guide plate 46 constitute a linear light source unit.

Referring to FIG. 21C, the light guide plate 10 has second opposing surfaces 19' which are so inclined to become lower toward one light incidence surface 12 and second opposing surfaces 19 which are so inclined as to become lower toward the other light incidence surface 12'. Therefore, the prism structure of the light guide plate 10 acts on the rays of light emitted from the LEDs 22 at both ends.

In this Example, the regions where the LEDs 22 are arranged are increased by two places into a total of four regions as compared to the prior art, and an increased number of LEDs 22 are arranged not being close to each other. Therefore, there is realized a light source device featuring higher brightness and longer life.

If there are provided light-mixing regions 42 same as those of Examples 2-1 and 2-2 at both ends of the light guide plate 10, there can be arranged LEDs 22a, 22b, 22c in a number twice as large as those of Examples 2-1 and 2-2. Further, if the prism structure of the light guide plate 10 is formed in the shape of a cone or a lens so as to act upon the rays of light from the four directions or from all directions, then, the LEDs 22a, 22b and 22c can be arranged along all of the four sides of the light guide plate 10. Then, there can be arranged the LEDs 22, 22a, 22b and 22c in a number twice as great.

According to this Example as described above, there are provided a display device and a light source device used therefor featuring a long life and excellent display characteristics. Though Examples 2-1, 2-2 and 2-4 have dealt with the liquid crystal display devices of the front-light type, it should be noted that the invention is applicable to the liquid crystal display devices of the back-light type, too.

According to this invention as described above, there are realized a display device featuring a decreased dispersion in the brightness, a high contrast and a good display quality, a light source device used therefor and a light guide plate.

What is claimed is:

1. A light guide plate comprising:
a light incidence portion having a light incidence surface where light emitted from a point source of light enters;
a light reflection surface formed facing the light incidence surface to reflect light from the light incidence surface;
a light outgoing surface arranged between the light incidence surface and the light reflection surface, and having a circularly polarizing plate intimately adhered onto the surface thereof;
an opposing surface formed facing the light outgoing surface and in which there are alternately arranged first opposing surfaces for guiding the incident light to the light reflection surface with the light outgoing surface, and second opposing surfaces for emitting the light reflected by the light reflection surface through the light outgoing surface; and
side end surfaces arranged between the light incidence surface and the light reflection surface that are formed at both ends of the light outgoing surface and of the opposing surface;
wherein the light incident portion comprises a light guide passage having sloped portions toward the light outgoing surface and the opposing surface.

2. A light guide plate comprising:
a light incidence portion having a light incidence surface where light emitted from a point source of light enters;
a light reflection surface formed in a parabolic shape facing the light incidence surface with the position where the point source of light is arranged as a focal point that reflects light transmitted from the light incidence surface;
a light outgoing surface arranged between the light incidence surface and the light reflection surface;
an opposing surface formed facing the light outgoing surface and in which there are alternately arranged first opposing surfaces for guiding the incident light to the light reflection surface with the light outgoing surface, and second opposing surfaces for emitting the light reflected by the light reflection surface through the light outgoing surface; and
side end surfaces arranged between the light incidence surface and the light reflection surface that are formed at both ends of the light outgoing surface and of the opposing surface.

3. A light guide plate according to claim 2, wherein the light outgoing surface has a circularly polarizing plate that is intimately adhered to the surface thereof.

4. A light guide plate according to claim 1, wherein the first opposing surfaces are formed being so inclined as to become lower toward the side of the light incidence portion, the angle $\alpha$ of inclination with respect to the light outgoing surface being $0° \leq \alpha \leq 1.0°$.

5. A light guide plate comprising:
a light incidence portion having a light incidence surface where light emitted from a point source of light enters;
a light reflection surface formed facing the light incidence surface to reflect light from the light incidence surface;
a light outgoing surface arranged between the light incidence surface and the light reflection surface, and having a circularly polarizing plate intimately adhered onto the surface thereof;
an opposing surface formed facing the light outgoing surface and in which there are alternately arranged first opposing surfaces for guiding the incident light to the light reflection surface with the light outgoing surface, and second opposing surfaces for emitting the light reflected by the light reflection surface through the light outgoing surface; and side end surfaces arranged between the light incidence surface and the light reflection surface that are formed at both ends of the light outgoing surface and of the opposing surface;

wherein the second opposing surfaces are formed being so inclined as to become lower toward the side of the light incidence portion, the angle β of inclination with respect to the light outgoing surface being 30°≦β≦40°.

6. A light guide plate comprising:
a light incidence portion having a light incidence surface where light emitted from a point source of light enters;
a light reflection surface formed facing the light incidence surface to reflect light from the light incidence surface;
a light outgoing surface arranged between the light incidence surface and the light reflection surface, and having a circularly polarizing plate intimately adhered onto the surface thereof;
an opposing surface formed facing the light outgoing surface and in which there are alternately arranged first opposing surfaces for guiding the incident light to the light reflection surface with the light outgoing surface, and second opposing surfaces for emitting the light reflected by the light reflection surface through the light outgoing surface; and
side end surfaces arranged between the light incidence surface and the light reflection surface that are formed at both ends of the light outgoing surface and of the opposing surface;
wherein the light incidence portion has a directivity-improving portion for improving the directivity of incident light.

7. A light guide plate according to claim 6, wherein the directivity-improving portion has a tapered surface which so works as to increase the angles of incidence of light incident upon the light outgoing surface and upon the first opposing surfaces.

8. A light guide plate according to claim 6, wherein the directivity-improving portion has a surface that is tapered as viewed from the side of the display screen, and when the distance between the light incidence surface and the light reflection surface is denoted by L3, and the distance between the side ends by W3, then, the angle θ4 between the tapered surface and the side ends is θ4≦tan$^{-1}$ (W3/(2×L3)).

9. A light guide plate comprising:
a light incidence portion having a light incidence surface where light emitted from a point source of light enters;
a light reflection surface formed facing the light incidence surface to reflect light from the light incidence surface;
a light outgoing surface arranged between the light incidence surface and the light reflection surface, and having a circularly polarizing plate intimately adhered onto the surface thereof;
an opposing surface formed facing the light outgoing surface and in which there are alternately arranged first opposing surfaces for guiding the incident light to the light reflection surface with the light outgoing surface, and second opposing surfaces for emitting the light reflected by the light reflection surface through the light outgoing surface; and
side end surfaces arranged between the light incidence surface and the light reflection surface that are formed at both ends of the light outgoing surface and of the opposing surface;
wherein the side end surfaces have light-absorbing portions for absorbing incident light.

10. A light guide plate comprising:
a light incidence portion having a light incidence surface where light emitted from a point source of light enters;
a light reflection surface formed facing the light incidence surface to reflect light from the light incidence surface;
a light outgoing surface arranged between the light incidence surface and the light reflection surface, and having a circularly polarizing plate intimately adhered onto the surface thereof;
an opposing surface formed facing the light outgoing surface and in which there are alternately arranged first opposing surfaces for guiding the incident light to the light reflection surface with the light outgoing surface, and second opposing surfaces for emitting the light reflected by the light reflection surface through the light outgoing surface; and
side end surfaces arranged between the light incidence surface and the light reflection surface that are formed at both ends of the light outgoing surface and of the opposing surface;
wherein the incidence portion has a light reflection portion for reflecting the reflected light in the regions other than the region where the light enters.

11. A light guide plate comprising:
a light incidence portion having a light incidence surface where light emitted from a point source of light enters;
a light reflection surface formed facing the light incidence surface to reflect light from the light incidence surface;
a light outgoing surface arranged between the light incidence surface and the light reflection surface, and having a circularly polarizing plate intimately adhered onto the surface thereof;
an opposing surface formed facing the light outgoing surface and in which there are alternately arranged first opposing surfaces for guiding the incident light to the light reflection surface with the light outgoing surface, and second opposing surfaces for emitting the light reflected by the light reflection surface through the light outgoing surface; and
side end surfaces arranged between the light incidence surface and the light reflection surface that are formed at both ends of the light outgoing surface and of the opposing surface;
wherein the direction of extension of corner portions formed by the first opposing surfaces and by the second opposing surfaces, is inclined with respect to the light incidence surface.

12. A light guide plate according to claim 11, wherein the angle θ3 between the direction of extension and the light incidence surface is 10°≦|θ3|≦30°.

13. A light source device comprising:
a point source of light for emitting light; and
a light guide plate for guiding light;
wherein the light guide plate comprises:
a light incidence portion having a light incidence surface where light emitted from the point source of light enters;
a light reflection surface formed facing the light incidence surface to reflect light from the light incidence surface;
a light outgoing surface arranged between the light incidence surface and the light reflection surface, and having a circularly polarizing plate intimately adhered on to the surface thereof;

an opposing surface formed facing the light outgoing surface and in which there are alternately arranged first opposing surfaces for guiding the incident light to the light reflection surface with the light outgoing surface, and second opposing surfaces for emitting the light reflected by the light reflection surface through the light outgoing surface; and side end surfaces arranged between the light incidence surface and the light reflection surface that are formed at both ends of the light outgoing surface and of the opposing surface;

wherein the light incident portion comprises a light guide passage having sloped portions toward the light outgoing surface and the opposing surface.

14. A light source device comprising:

a plurality of point sources of light arranged maintaining a predetermined distance L to emit light;

a light-mixing region having a predetermined width D in a direction in which light travels to mix the rays of light emitted from the plurality of point sources of light;

a planar light source region having a light outgoing surface for emitting the rays of light mixed in the light-mixing region and an opposing surface formed facing the light outgoing surface; and a light guide passage having sloped portions toward the light outgoing surface and the opposing surface.

15. A light source device comprising:

a plurality of point sources of light arranged maintaining a predetermined distance L to emit light;

a light-mixing region having a predetermined width D in a direction in which light travels to mix the rays of light emitted from the plurality of point sources of light; and a planar light source region having a light outgoing surface for emitting the rays of light mixed in the light-mixing region;

wherein the distance L and the width D satisfy a relation, $$D > (L/2) \times \cot A$$

where A is a half-brightness angle of light falling on the light-mixing region.

16. A light source device comprising:

a plurality of point sources of light arranged maintaining a predetermined distance L to emit light;

a light-mixing region having a predetermined width D in a direction in which light travels to mix the rays of light emitted from the plurality of point sources of light; and a planar light source region having a light outgoing surface for emitting the rays of light mixed in the light-mixing region;

wherein the light-mixing region includes n regions Sn having a refractive index Nn relative to the planar light source region and a width Dn in a direction in which light travels, and wherein the distance L, refractive index Nn and width Dn satisfy a relation, $$(D1 \times \sin B/((N1^2 - (\sin B)^2)^{1/2}) + (D2 \times \sin B/((N2^2 - (\sin B)^2)^{1/2}) + \cdots + (Dn \times \sin B/((Nn^2 - (\sin B)^2)^{1/2}) > L/2$$

where B is a half-brightness angle of light falling on the planar light source region.

17. A light source device comprising:

a plurality of point sources of light arranged maintaining a predetermined distance L to emit light;

a light-mixing region having a predetermined width D in a direction in which light travels to mix the rays of light emitted from the plurality of point sources of light; and a planar light source region having a light outgoing surface for emitting the rays of light mixed in the light-mixing region;

wherein the plurality of point sources of light emit rays of light of a plurality of colors, the point sources of light emitting rays of light of nearly the same color are arranged maintaining a predetermined distance L', and the distance L' and the width D satisfy a relation, $$D > (L'/2) \times \cot A$$

where A is a half-brightness angle of light falling on the light-mixing region.

18. A light source device comprising:

a plurality of point sources of light arranged maintaining a predetermined distance L to emit light;

a light-mixing region having a predetermined width D in a direction in which light travels to mix the rays of light emitted from the plurality of point sources of light; and a planar light source region having a light outgoing surface for emitting the rays of light mixed in the light-mixing region;

wherein the plurality of point sources of light emit rays of light of a plurality of colors, the point sources of light emitting rays of light of nearly the same color are arranged maintaining a predetermined distance L', the light-mixing region includes n regions Sn having a refractive index Nn relative to the planar light source region and a width Dn in a direction in which light travels, and wherein the distance L', refractive index Nn and width Dn satisfy a relation, $$(D1 \times \sin B/((N1^2 - (\sin B)^2)^{1/2}) + (D2 \times \sin B/((N2^2 - (\sin B)^2)^{1/2}) + \cdots + (Dn \times \sin B/((Nn^2 - (\sin B)^2)^{1/2}) > L'/2$$

where B is a half-brightness angle of light falling on the planar light source region.

19. A light source device comprising:

a plurality of point sources of light arranged maintaining a predetermined distance to emit light;

a light incidence portion arranged neighboring the plurality of point sources of light and having a light incidence surface where the light enters;

a light reflection surface formed facing the light incidence surface that reflects the light;

a light outgoing surface for emitting the light reflected by the light reflection surface; and an opposing surface formed facing the light outgoing surface and in which there are alternately arranged first opposing surfaces to guide light incident on the light incidence surface to the light reflection surface, and second opposing surfaces for reflecting the light reflected by the light reflection surface so as to be emitted through the light outgoing surface;

wherein the light incident portion comprises a light guide passage having sloped portions toward the light outgoing surface and the opposing surface.

20. A light source device comprising:

a plurality of linear sources of light for emitting light;

a light incidence portion arranged neighboring the plurality of linear sources of light and having a plurality of light incidence surfaces on where the light enters;

a light outgoing surface for emitting the light; and an opposing surface formed facing the light outgoing surface and in which there are arranged first opposing surfaces for guiding light and second opposing surfaces for reflecting the light so as to be emitted through the light outgoing surface;

wherein the light incident portion comprises a light guide passage having sloped portions toward the light outgoing surface and the opposing surface.

21. A display device comprising:
a display panel having pixels arranged like a matrix; and
a light source device for illuminating the display panel;
wherein the light source device comprises a point source of light for emitting light; and
a light guide plate for guiding light;
wherein the light guide plate comprises:
a light incidence portion having a light incidence surface on where light emitted from the point source of light enters;
a light reflection surface formed facing the light incidence surface to reflect light from the light incidence surface;
a light outgoing surface arranged between the light incidence surface and the light reflection surface, and having a circularly polarizing plate intimately adhered onto the surface thereof;
an opposing surface formed facing the light outgoing surface and in which there are alternately arranged first opposing surfaces for guiding the incident light to the light reflection surface with the light outgoing surface, and second opposing surfaces for emitting the light reflected by the light reflection surface through the light outgoing surface; and
side end surfaces arranged between the light incidence surface and the light reflection surface that are formed at both ends of the light outgoing surface and of the opposing surface;
wherein the light incident portion comprises a light guide passage having sloped portions toward the light outgoing surface and the opposing surface.

22. A display device according to claim 21, wherein the light source device is arranged on the side of the display screen of the display panel.

23. A display device according to claim 21, wherein the display panel is a liquid crystal display panel having a pair of substrates and liquid crystals sealed between the pair of substrates.

24. A light source device comprising:
a plurality of point sources of light arranged maintaining a predetermined distance L to emit light;
a light-mixing region having a predetermined width D in a direction in which light travels to mix the rays of light emitted from the plurality of point sources of light;
a planar light source region having a light outgoing surface for emitting the rays of light mixed in the light-mixing region and a light reflection surface formed in a parabolic shape that reflects light mixed in the light-mixing region.

25. A light source device comprising:
a plurality of point sources of light arranged maintaining a predetermined distance L to emit light;
a light-mixing region having a predetermined width D in a direction in which light travels to mix the rays of light emitted from the plurality of point sources of light;
a planar light source region having a light outgoing surface for emitting the rays of light mixed in the light-mixing region, a light reflection surface formed in a parabolic shape that reflects light mixed in the light-mixing region, and an opposing surface formed facing the light outgoing surface; and
a light guide passage having sloped portions toward the light outgoing surface and the opposing surface.

26. A light source device comprising:
a plurality of point sources of light arranged maintaining a predetermined distance to emit light;
a light incidence portion arranged neighboring the plurality of point sources of light and having a light incidence surface where the light enters;
a light reflection surface formed in a parabolic shape facing the light incidence surface that reflects light transmitted from the light incidence surface;
a light outgoing surface for emitting the light reflected by the light reflection surface; and
an opposing surface formed facing the light outgoing surface and in which there are alternately arranged first opposing surfaces to guide light incident on the light incidence surface to the light reflection surface, and second opposing surfaces for reflecting the light reflected by the light reflection surface so as to be emitted through the light outgoing surface.

27. A light source device comprising:
a plurality of point sources of light arranged maintaining a predetermined distance to emit light;
a light incidence portion arranged neighboring the plurality of point sources of light and having a light incidence surface where the light enters;
a light reflection surface formed in a parabolic shape facing the light incidence surface that reflects light transmitted from the light incidence surface;
a light outgoing surface for emitting the light reflected by the light reflection surface; and
an opposing surface formed facing the light outgoing surface and in which there are alternately arranged first opposing surfaces to guide light incident on the light incidence surface to the light reflection surface, and second opposing surfaces for reflecting the light reflected by the light reflection surface so as to be emitted through the light outgoing surface;
wherein the light incident portion comprises a light guide passage having sloped portions toward the light outgoing surface and the opposing surface.

28. A light source device comprising:
a plurality of linear sources of light for emitting light;
a light incidence portion arranged neighboring the plurality of linear sources of light and having a plurality of light incidence surfaces where the light enters;
a plurality of light reflection surfaces formed in a parabolic shape facing the plurality of light incidence surfaces that reflect light transmitted from the light incidence surfaces respectfully;
a light outgoing surface for emitting the light; and
an opposing surface formed facing the light outgoing surface and in which there are arranged first opposing surfaces for guiding light and second opposing surfaces for reflecting the light so as to be emitted through the light outgoing surface.

29. A light source device comprising:
a plurality of linear sources of light for emitting light;
a light incidence portion arranged neighboring the plurality of linear sources of light and having a plurality of light incidence surfaces where the light enters;
a plurality of light reflection surfaces formed in a parabolic shape facing the plurality of light incidence surfaces that reflects light transmitted from the light incidence surfaces respectfully;
a light outgoing surface for emitting the light;
an opposing surface formed facing the light outgoing surface and in which there are arranged first opposing surfaces for guiding light and second opposing surfaces for reflecting the light so as to be emitted through the light outgoing surface; and wherein the light incident portion comprises a light guide passage having sloped portions toward the light outgoing surface and the opposing surface.

30. A display device comprising:
a display panel having pixels arranged like a matrix; and
a light source device for illuminating the display panel;
wherein the light source device comprises a point source of light for emitting light; and
a light guide plate for guiding light; wherein the light guide plate comprises:
a light incidence portion having a light incidence surface where light emitted from the point source of light enters;
a light reflection surface formed a parabolic shape facing the light incidence surface with the position where the point source of light is arranged as a focal point that reflects light transmitted from the light incidence surface;
a light outgoing surface arranged between the light incidence surface and the light reflection surface, and having a circularly polarizing plate intimately adhered onto the surface thereof;
an opposing surface formed facing the light outgoing surface and in which there are alternately arranged first opposing surfaces for guiding the incident light to the light reflection surface with the light outgoing surface, and second opposing surfaces for emitting the light reflected by the light reflection surface though the light outgoing surface; and
side end surfaces arranged between the light incidence surface and the light reflection surface that are formed at both ends of the light outgoing surface and of the opposing surface.

31. A display device comprising:
a display panel having pixels arranged like a matrix; and
a light source device for illuminating the display panel;
wherein the light source device comprises a point source of light for emitting light; and
a light guide plate for guiding light;
wherein the light guide plate comprises:
a light incidence portion having a light incidence surface where light emitted from the point source of light enters;
a light reflection surface formed in a parabolic shape facing the light incidence surface with the position where the point source of light is arranged as a focal point that reflects light transmitted from the light incidence surface;
a light outgoing surface arranged between the light incidence surface and the light reflection surface, and having a circularly polarizing plate intimately adhered onto the surface thereof;
an opposing surface formed facing the light outgoing surface and in which
there are alternately arranged first opposing surfaces for guiding the incident light to the light reflection surface with the light outgoing surface, and second opposing surfaces for emitting the light reflected by the light reflection surface through the light outgoing surface; and
side end surfaces arranged between the light incidence surface and the light reflection surface that are formed at both ends of the light outgoing surface and of the opposing surface;
wherein the light incident portion comprises a light guide passage having sloped portions toward the light outgoing surface and the opposing surface.

* * * * *

UNITED STATES PATENT AND TRADEMARK OFFICE
CERTIFICATE OF CORRECTION

| | | |
|---|---|---|
| PATENT NO. | : 7,073,933 B2 | Page 1 of 1 |
| APPLICATION NO. | : 10/264864 | |
| DATED | : July 11, 2006 | |
| INVENTOR(S) | : Gotoh et al. | |

It is certified that error appears in the above-identified patent and that said Letters Patent is hereby corrected as shown below:

In the Claims:

Col. 24, line 53, delete "03" and insert --Ɵ3--.

Signed and Sealed this

Nineteenth Day of December, 2006

JON W. DUDAS
*Director of the United States Patent and Trademark Office*